United States Patent
Wray et al.

(10) Patent No.: US 11,702,070 B2
(45) Date of Patent: Jul. 18, 2023

(54) AUTONOMOUS VEHICLE OPERATION WITH EXPLICIT OCCLUSION REASONING

(71) Applicants: Nissan North America, Inc., Franklin, TN (US); The University of Massachusetts, Boston, MA (US); Renault S.A.S., Boulogne-Billancourt (FR)

(72) Inventors: Kyle Hollins Wray, Fremont, CA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/753,601

(22) PCT Filed: Oct. 31, 2017

(86) PCT No.: PCT/US2017/059374
§ 371 (c)(1),
(2) Date: Apr. 3, 2020

(87) PCT Pub. No.: WO2019/089015
PCT Pub. Date: May 9, 2019

(65) Prior Publication Data
US 2021/0261123 A1     Aug. 26, 2021

(51) Int. Cl.
*B60W 30/095*     (2012.01)
*B60W 60/00*     (2020.01)
(Continued)

(52) U.S. Cl.
CPC .. *B60W 30/0956* (2013.01); *B60W 30/18163* (2013.01); *B60W 60/001* (2020.02);
(Continued)

(58) Field of Classification Search
CPC ............... B60W 30/08; B60W 30/095; B60W 30/0956; B60W 30/18154;
(Continued)

(56) References Cited

U.S. PATENT DOCUMENTS

| | | |
|---|---|---|
| 4,751,570 A | 6/1988 | Robinson |
| 5,615,116 A | 3/1997 | Gudat et al. |

(Continued)

FOREIGN PATENT DOCUMENTS

| | | |
|---|---|---|
| CN | 103945486 A | 7/2014 |
| CN | 105216795 A | 1/2016 |

(Continued)

OTHER PUBLICATIONS

Brechtel et al.; Probabilistic decision-making under uncertainty for autonomous driving using continuous POMDPs; In: 2014 IEEE 17th International Conference on Intelligent Transportation Systems (ITSC); Oct. 11, 2014.

(Continued)

*Primary Examiner* — Russell Frejd
*Assistant Examiner* — Brandon Z Willis
(74) *Attorney, Agent, or Firm* — Young Basile Hanlon & MacFarlane, P.C.

(57) ABSTRACT

Autonomous vehicle operation with explicit occlusion reasoning may include traversing, by a vehicle, a vehicle transporation network. Traversing the vehicle transportation network can include receiving, from a sensor of the vehicle, sensor data for a portion of a vehicle operational environment, determining, using the sensor data, a visibility grid comprising coordinates forming an unobserved region (Continued)

within a defined distance from the vehicle, computing a probability of a presence of an external object within the unobserved region by comparing the visibility grid to a map (e.g., a high-definition map), and traversing a portion of the vehicle transportation network using the probability. An apparatus and a vehicle are also described.

19 Claims, 8 Drawing Sheets

(51) Int. Cl.
  *B60W 30/18* (2012.01)
  *G06V 20/58* (2022.01)
(52) U.S. Cl.
  CPC .......... *G06V 20/58* (2022.01); *B60W 2420/42* (2013.01); *B60W 2420/52* (2013.01); *B60W 2552/53* (2020.02); *B60W 2554/4029* (2020.02); *B60W 2554/80* (2020.02)
(58) Field of Classification Search
  CPC ..... B60W 30/18159; B60W 30/18163; B60W 40/02; B60W 2050/002; B60W 2050/0026; B60W 60/001; B60W 60/0015; B60W 60/0027; B60W 60/00272; B60W 2420/52; B60W 2420/42; B60W 2552/53; B60W 2554/4029; B60W 2554/80; G06K 9/00624; G06K 9/00785; G06K 9/00791; G06K 9/00798; G06K 9/00805; G06K 9/00825; G08G 1/167; G08G 1/166
  See application file for complete search history.

(56) References Cited

U.S. PATENT DOCUMENTS

| | | | |
|---|---|---|---|
| 6,076,034 | A | 6/2000 | Satoh et al. |
| 8,762,006 | B2 | 6/2014 | Miller |
| 8,781,669 | B1 | 7/2014 | Teller et al. |
| 8,849,483 | B2 | 9/2014 | Kuwata et al. |
| 8,884,782 | B2 | 11/2014 | Rubin et al. |
| 9,081,651 | B2 | 7/2015 | Filev et al. |
| 9,103,671 | B1 | 8/2015 | Breed et al. |
| 9,134,731 | B2 | 9/2015 | Healey et al. |
| 9,494,439 | B1 | 11/2016 | Ross et al. |
| 9,568,915 | B1 | 2/2017 | Berntorp et al. |
| 9,646,428 | B1 | 5/2017 | Konrardy et al. |
| 9,972,054 | B1 | 5/2018 | Konrardy et al. |
| 10,029,701 | B2 | 7/2018 | Gordon et al. |
| 10,061,326 | B2 | 8/2018 | Gordon et al. |
| 10,093,322 | B2 | 10/2018 | Gordon et al. |
| 10,126,135 | B2 | 11/2018 | Mortazavi et al. |
| 10,185,998 | B1 | 1/2019 | Konrardy et al. |
| 10,254,759 | B1 | 4/2019 | Faust et al. |
| 10,319,039 | B1 | 6/2019 | Konrardy et al. |
| 10,371,130 | B2 | 8/2019 | Deng et al. |
| 10,380,886 | B2 | 8/2019 | Ran et al. |
| 10,408,638 | B2 | 9/2019 | Berntorp et al. |
| 10,514,705 | B2 | 12/2019 | Shalev-Shwartz et al. |
| 10,518,764 | B2 | 12/2019 | Cao et al. |
| 10,538,252 | B2 | 1/2020 | Ebina et al. |
| 10,599,155 | B1 | 3/2020 | Konrardy et al. |
| 10,990,096 | B2 | 4/2021 | Isele et al. |
| 11,037,320 | B1 | 6/2021 | Ebrahimi Afrouzi et al. |
| 2004/0068351 | A1 | 4/2004 | Solomon |
| 2005/0057370 | A1 | 3/2005 | Warrior et al. |
| 2007/0021915 | A1 | 1/2007 | Breed et al. |
| 2007/0168096 | A1 | 7/2007 | Boutin |
| 2008/0097699 | A1* | 4/2008 | Ono .................. B62D 15/0265 701/300 |
| 2009/0088916 | A1 | 4/2009 | Elgersma et al. |
| 2009/0140887 | A1 | 6/2009 | Breed et al. |
| 2009/0299496 | A1 | 12/2009 | Cade |
| 2009/0326819 | A1* | 12/2009 | Taguchi .............. G01S 13/931 701/301 |
| 2010/0223216 | A1 | 9/2010 | Eggert et al. |
| 2011/0016067 | A1 | 1/2011 | Levchuk et al. |
| 2011/0102195 | A1* | 5/2011 | Kushi ............. G08G 1/096783 340/905 |
| 2012/0150437 | A1 | 6/2012 | Zeng et al. |
| 2012/0233102 | A1 | 9/2012 | James |
| 2012/0290152 | A1 | 11/2012 | Cheung et al. |
| 2013/0318023 | A1 | 11/2013 | Morimura et al. |
| 2014/0067483 | A1 | 3/2014 | Jeong et al. |
| 2014/0136414 | A1 | 5/2014 | Abhyanker |
| 2014/0201838 | A1 | 7/2014 | Varsanyi et al. |
| 2014/0222277 | A1 | 8/2014 | Tsimhoni et al. |
| 2014/0244114 | A1 | 8/2014 | Matsubara |
| 2014/0309838 | A1 | 10/2014 | Ricci |
| 2015/0039157 | A1 | 2/2015 | Wolfe et al. |
| 2015/0070156 | A1 | 3/2015 | Milburn, Jr. |
| 2015/0081156 | A1 | 3/2015 | Trepagnier et al. |
| 2015/0105961 | A1 | 4/2015 | Callow |
| 2015/0106010 | A1 | 4/2015 | Martin et al. |
| 2015/0153735 | A1 | 6/2015 | Clarke et al. |
| 2015/0183431 | A1 | 7/2015 | Nanami |
| 2015/0210274 | A1 | 7/2015 | Clarke et al. |
| 2015/0253772 | A1 | 9/2015 | Solyom et al. |
| 2015/0329130 | A1 | 11/2015 | Carlson et al. |
| 2015/0345966 | A1 | 12/2015 | Meuleau |
| 2015/0345967 | A1 | 12/2015 | Meuleau |
| 2015/0370228 | A1 | 12/2015 | Kohn et al. |
| 2015/0375748 | A1 | 12/2015 | Nagase et al. |
| 2016/0068158 | A1 | 3/2016 | Elwart et al. |
| 2016/0129907 | A1 | 5/2016 | Kim et al. |
| 2016/0161270 | A1 | 6/2016 | Okumura |
| 2016/0209842 | A1 | 7/2016 | Thakur et al. |
| 2016/0209843 | A1 | 7/2016 | Meuleau et al. |
| 2016/0209848 | A1 | 7/2016 | Kojo et al. |
| 2016/0260328 | A1 | 9/2016 | Mishra et al. |
| 2016/0318511 | A1 | 11/2016 | Rangwala |
| 2016/0318515 | A1 | 11/2016 | Laur et al. |
| 2016/0334230 | A1 | 11/2016 | Ross et al. |
| 2016/0334797 | A1 | 11/2016 | Ross et al. |
| 2016/0335892 | A1 | 11/2016 | Okada et al. |
| 2016/0339919 | A1 | 11/2016 | Habu et al. |
| 2016/0375766 | A1 | 12/2016 | Konet et al. |
| 2016/0375768 | A1 | 12/2016 | Konet et al. |
| 2017/0008168 | A1 | 1/2017 | Weng et al. |
| 2017/0010108 | A1 | 1/2017 | Shashua |
| 2017/0010617 | A1 | 1/2017 | Shashua et al. |
| 2017/0031361 | A1 | 2/2017 | Olson et al. |
| 2017/0032590 | A1 | 2/2017 | Stefan et al. |
| 2017/0038777 | A1 | 2/2017 | Harvey |
| 2017/0090478 | A1 | 3/2017 | Blayvas et al. |
| 2017/0090480 | A1 | 3/2017 | Ho et al. |
| 2017/0102700 | A1 | 4/2017 | Kozak |
| 2017/0124476 | A1 | 5/2017 | Levinson et al. |
| 2017/0137025 | A1 | 5/2017 | Muto et al. |
| 2017/0158193 | A1 | 6/2017 | Lopez et al. |
| 2017/0215045 | A1 | 7/2017 | Rasal et al. |
| 2017/0225760 | A1 | 8/2017 | Sidki et al. |
| 2017/0236422 | A1 | 8/2017 | Naka et al. |
| 2017/0261325 | A1 | 9/2017 | Schroeder et al. |
| 2017/0262790 | A1 | 9/2017 | Khasis |
| 2017/0276780 | A1* | 9/2017 | Takehara ............... G08G 1/167 |
| 2017/0277193 | A1 | 9/2017 | Frazzoli et al. |
| 2017/0297576 | A1 | 10/2017 | Halder et al. |
| 2017/0329338 | A1 | 11/2017 | Wei et al. |
| 2017/0334451 | A1 | 11/2017 | Asakura et al. |
| 2017/0356746 | A1 | 12/2017 | Iagnemma |
| 2017/0357263 | A1 | 12/2017 | Glatfelter et al. |
| 2017/0364831 | A1 | 12/2017 | Ghosh et al. |
| 2017/0369051 | A1* | 12/2017 | Sakai ..................... G01S 17/931 |
| 2017/0369062 | A1 | 12/2017 | Saigusa et al. |
| 2017/0369067 | A1 | 12/2017 | Saigusa et al. |
| 2017/0371338 | A1* | 12/2017 | Kamata ............... G05D 1/0274 |
| 2018/0004214 | A1 | 1/2018 | Wisniowski et al. |
| 2018/0011494 | A1 | 1/2018 | Zhu et al. |
| 2018/0029500 | A1 | 2/2018 | Katanoda |
| 2018/0032079 | A1 | 2/2018 | Nishi |

(56) References Cited

U.S. PATENT DOCUMENTS

| | | |
|---|---|---|
| 2018/0046191 A1 | 2/2018 | Keller et al. |
| 2018/0129206 A1 | 5/2018 | Harada et al. |
| 2018/0147988 A1 | 5/2018 | Lee et al. |
| 2018/0173230 A1 | 6/2018 | Goldman-Shenhar et al. |
| 2018/0232585 A1 | 8/2018 | Kim |
| 2018/0290657 A1 | 10/2018 | Ryne et al. |
| 2018/0341880 A1 | 11/2018 | Kislovskiy et al. |
| 2018/0342033 A1 | 11/2018 | Kislovskiy et al. |
| 2018/0348786 A1 | 12/2018 | Yasui et al. |
| 2018/0349785 A1 | 12/2018 | Zheng et al. |
| 2018/0373245 A1 | 12/2018 | Nishi |
| 2019/0011918 A1 | 1/2019 | Son et al. |
| 2019/0047564 A1 | 2/2019 | Brady et al. |
| 2019/0047584 A1 | 2/2019 | Donnelly |
| 2019/0086549 A1* | 3/2019 | Ushani ................. G05D 1/0088 |
| 2019/0087307 A1 | 3/2019 | Zhan et al. |
| 2019/0096244 A1 | 3/2019 | Guruva Reddiar et al. |
| 2019/0101919 A1 | 4/2019 | Kabilarov et al. |
| 2019/0113918 A1 | 4/2019 | England et al. |
| 2019/0129436 A1 | 5/2019 | Sun et al. |
| 2019/0135281 A1 | 5/2019 | Miura et al. |
| 2019/0193722 A1 | 6/2019 | Yamamuro et al. |
| 2019/0196471 A1 | 6/2019 | Vaughn et al. |
| 2019/0202476 A1 | 7/2019 | Tao et al. |
| 2019/0258268 A1 | 8/2019 | Macneille et al. |
| 2019/0295179 A1 | 9/2019 | Shalev-Shwartz et al. |
| 2019/0299991 A1 | 10/2019 | Horii et al. |
| 2019/0310632 A1 | 10/2019 | Nakhaei Sarvedani |
| 2019/0310654 A1 | 10/2019 | Halder |
| 2019/0317506 A1 | 10/2019 | Ishioka |
| 2019/0329771 A1 | 10/2019 | Wray et al. |
| 2019/0329782 A1 | 10/2019 | Shalev-Shwartz et al. |
| 2019/0339088 A1 | 11/2019 | Jeswani et al. |
| 2019/0359209 A1 | 11/2019 | Mizutani et al. |
| 2020/0079377 A1 | 3/2020 | Yashiro et al. |
| 2020/0097008 A1 | 3/2020 | Sadat et al. |
| 2020/0180647 A1 | 6/2020 | Anthony |
| 2020/0269871 A1 | 8/2020 | Schmidt et al. |
| 2020/0269875 A1 | 8/2020 | Wray et al. |
| 2020/0279488 A1 | 9/2020 | Shibasaki |
| 2020/0293041 A1 | 9/2020 | Palanisamy |
| 2020/0356828 A1 | 11/2020 | Palanisamy et al. |
| 2020/0363814 A1 | 11/2020 | He et al. |
| 2020/0389469 A1 | 12/2020 | Litichever et al. |
| 2020/0406906 A1 | 12/2020 | Omari et al. |
| 2021/0024092 A1 | 1/2021 | Han et al. |
| 2021/0089048 A1 | 3/2021 | Tran |
| 2021/0116915 A1 | 4/2021 | Jiang et al. |
| 2021/0237759 A1 | 8/2021 | Wray et al. |
| 2021/0240190 A1 | 8/2021 | Wray et al. |
| 2021/0279331 A1 | 9/2021 | Gilad et al. |
| 2021/0294323 A1 | 9/2021 | Bentahar et al. |
| 2021/0374540 A1 | 12/2021 | Yuan et al. |

FOREIGN PATENT DOCUMENTS

| | | |
|---|---|---|
| CN | 105620470 A | 6/2016 |
| CN | 105635849 A | 6/2016 |
| CN | 106103232 A | 11/2016 |
| CN | 106184223 A | 12/2016 |
| CN | 106428000 A | 2/2017 |
| CN | 107577227 A | 1/2018 |
| DE | 10341753 A1 | 4/2005 |
| DE | 102012005245 A1 | 9/2012 |
| DE | 102012220134 A1 | 5/2014 |
| DE | 102013212255 A1 | 12/2014 |
| DE | 102015201272 A1 | 7/2016 |
| DE | 102016203086 A1 | 8/2017 |
| EP | 2084690 A2 | 8/2009 |
| EP | 2902864 A1 | 8/2015 |
| EP | 2958783 A1 | 12/2015 |
| EP | 3273423 A1 | 1/2018 |
| JP | H02-114304 A | 4/1990 |
| JP | 2007179388 A | 7/2007 |
| JP | 2012-221291 A | 11/2012 |
| JP | 2015-140181 A | 8/2015 |
| JP | 2015-199439 A | 11/2015 |
| JP | 2015191273 A | 11/2015 |
| JP | 2016017914 A | 2/2016 |
| JP | 2016139163 A | 8/2016 |
| JP | 201781426 A | 5/2017 |
| JP | 2018-49445 A | 3/2018 |
| RU | 2436167 C1 | 12/2011 |
| WO | 2008/053373 A2 | 5/2008 |
| WO | 2012-172632 A1 | 12/2012 |
| WO | 2014/024336 A1 | 2/2014 |
| WO | 2014/130178 A1 | 8/2014 |
| WO | 2015/052865 A1 | 4/2015 |
| WO | 2015112651 A1 | 7/2015 |
| WO | 2015/134558 A1 | 9/2015 |
| WO | 2016121572 A1 | 8/2016 |
| WO | 2016124178 A1 | 8/2016 |
| WO | 2016129067 A1 | 8/2016 |
| WO | 2016130719 A2 | 8/2016 |
| WO | 2017/013746 A1 | 1/2017 |
| WO | 2017/013749 A1 | 1/2017 |
| WO | 2017/022448 A1 | 2/2017 |
| WO | 2017/120336 A2 | 7/2017 |
| WO | 2018147872 A1 | 8/2018 |
| WO | 2018147874 A1 | 8/2018 |
| WO | 2020075961 A1 | 4/2020 |

OTHER PUBLICATIONS

Santana et al.; Robust Coordination of Autonomous Systems through Risk-sensitive, Model-based Programming and Execution; Massachusetts Inst of Tech Cambridge Computer Science and Artificial Intelligence Lab; Oct. 9, 2015.

Kala et al.; Motion Planning of Autonomous Vehicles on a Dual Carriageway without Speed Lanes; Electronics; Jan. 13, 2015.

Matthews et al.; Intent Communication between Autonomous Vehicles and Pedestrians; 2015.

Ragi et al.; UAV path planning in a dynamic environment via partially observable Markov decision process; IEEE Transactions on Aerospace and Electronic Systems; Oct. 8, 2013.

Aoki, S et al., A Merging Protocol for Self-Driving Vehicles, ICCPS, Apr. 2017.

International Application No. PCT/US2017/017493, filed Feb. 10, 2017.

International Application No. PCT/US2017/017502, filed Feb. 10, 2017.

International Application No. PCT/US2017/017516, filed Feb. 10, 2017.

International Application No. PCT/US2017/017527, filed Feb. 10, 2017.

U.S. Appl. No. 15/621,862, filed Jun. 13, 2017.

Chryssanthacopoulos et al., Decomposition Method for Optimized Collision Avoidance with Multiple Threats; DASC 2011, 30th IEEE/AIAA Digital Avionics Systems Conference, Oct. 16-20, 2011, 21 pages; https://ieeexplore.ieee.org/document/6095973.

Wray et al., Online Decision-Making for Scalable Autonomous Systems; Conference: Twenty-Sixth International Joint Conference on Artificial Intelligence; Conference Paper Aug. 2017 ; 7 pages https://www.researchgate.net/publication/318830226_Online_Decision-Making_for_Scalable_Autonomous_Systems.

Wray et al., Online Decision-Making for Scalable Autonomous Systems; Power Point Presentation; Aug. 23, 2017.

Miller, Tim, Explanation in Artificial Intelligence: Insights from the Social Sciences; Aug. 15, 2018; 66 pages; arXiv:1706.07269v3 ; https://arxiv.org/abs/1706.07269.

Bouton et al., Scalable Decision Making with Sensor Occlusions for Autonomous Driving; 2018 IEEE International Conference on Robotics and Automation (ICRA), Brisbane, Australia, May 21-25, 2018; 6 pages.

Brechtel et al., Probabilistic Decision-Making Under Uncertainty for Autonomous Driving Using Continuous POMPDs, 2014 IEEE 17th International Conference on Intelligent Transportation Systems, Oct. 8-11, 2014; pp. 392-399.

(56) References Cited

OTHER PUBLICATIONS

Bai et al., Intention-Aware Online POMPD Planning for Autonomous Driving in a Crowd; 2015 IEEE International Conference on Robotics and Automation; Washington State Convention Center, Seattle, Washington; May 26-30, 2015; pp. 454-460.
Extended European Search Report of corresponding application EP 17895657.9; dated Feb. 25, 2020; 9 pages.
Tang et al., Modeling Drivers' Dynamic Decision-Making Behavior During the Phase Transition Period: An Analytical Approach Based on Hidden Markov Model Theory, IEEE Transactions On Intelligent Transportation Systems, vol. 17, No. 1, Jan. 2016. (9 pages).
Dai, P., Mausam, & Weld, D. (2021). Focused Topological Value Iteration. Proceedings of the International Conference on Automated Planning and Scheduling, 19(1), 82-89. https://doi.org/10.1609/icaps.v19i1.18138.

\* cited by examiner

AUTONOMOUS VEHICLE OPERATION WITH EXPLICIT OCCLUSION REASONING

CROSS-REFERENCE TO RELATED APPLICATION

This application is a 371 national stage of International Application Serial No. PCT/US2017/059374, filed Oct. 31, 2017, the entire disclosure of which is hereby incorporated by reference.

TECHNICAL FIELD

This disclosure relates generally to autonomous vehicle operational management and autonomous driving, and more particularly to autonomous vehicle operation that uses explicit reasoning regarding occlusions.

BACKGROUND

A vehicle, such as an autonomous vehicle, may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. On occasion, an occlusion makes some data is unavailable.

SUMMARY

Disclosed herein are aspects, features, elements, implementations, and embodiments of autonomous vehicle operation with explicit occlusion reasoning.

An aspect of the disclosed embodiments is a method for use in traversing a vehicle transportation network. The method includes receiving, from a sensor of the vehicle, sensor data for a portion of a vehicle operational environment, determining, using the sensor data, a visibility grid comprising coordinates forming an unobserved region within a defined distance from the vehicle, computing a probability of a presence of an external object within the unobserved region by comparing the visibility grid to a map, and traversing a portion of the vehicle transportation network using the probability.

Another aspect of the disclosed embodiments is an apparatus for use in traversing a vehicle transportation network that includes a non-transitory computer readable medium and a processor. The processor is configured to execute instructions stored on the non-transitory computer readable medium to receive, from a sensor of a vehicle, sensor data for a portion of a vehicle operational environment, determine, using the sensor data, a visibility grid comprising coordinates forming an unobserved region within a defined distance from the vehicle, compute a probability of a presence of an external object within the unobserved region by comparing the visibility grid to a map, and traverse a portion of a vehicle transportation network using the probability.

The disclosure also describes a vehicle that includes the apparatus and a scenario-specific operational control evaluation module instance of a scenario-specific operational control evaluation module receiving the probability from the apparatus, the scenario-specific operational control evaluation module modeling a distinct vehicle operational scenario.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
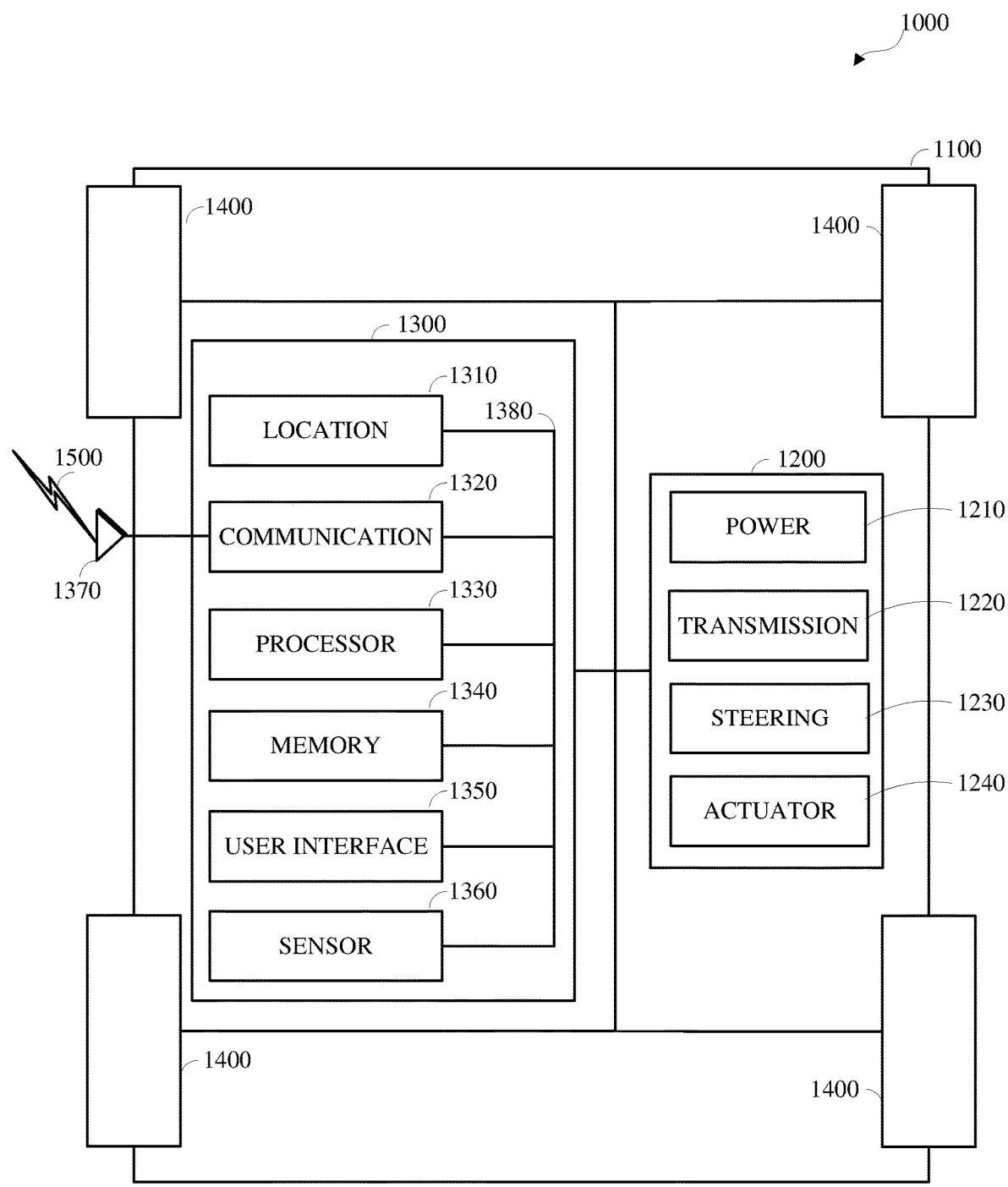
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

The autonomous vehicle may include an autonomous vehicle operational management system, which may include one or more operational environment monitors that may process operational environment information, such as the sensor data, for the autonomous vehicle. The operational environment monitors may include a blocking monitor that may determine probability of availability information for portions of the vehicle transportation network spatiotemporally proximate to the autonomous vehicle.

The autonomous vehicle operational management system may include an autonomous vehicle operational management controller, which may detect one or more operational scenarios, such as pedestrian scenarios, intersection scenarios, lane change scenarios, or any other vehicle operational scenario or combination of vehicle operational scenarios, corresponding to the external objects.

The autonomous vehicle operational management system may include one or more scenario-specific operational control evaluation modules. Each scenario-specific operational control evaluation module may be a model, such as a Partially Observable Markov Decision Process (POMDP) model, of a respective operational scenario. That is, each model is configured to handle a specific scenario. The autonomous vehicle operational management controller may instantiate respective instances of the scenario-specific operational control evaluation modules in response to detecting the corresponding operational scenarios.

The autonomous vehicle operational management controller may receive candidate vehicle control actions from respective instantiated scenario-specific operational control evaluation module (SSOCEM) instances, may identify a vehicle control action from the candidate vehicle control actions, and may control the autonomous vehicle to traverse a portion of the vehicle transportation network according to the identified vehicle control action.

Fixed objects, such as trees, and mobile objects, such as trucks or other vehicles, within a vehicle transportation network can occlude the normal range of a vehicle sensor. When such an occlusion exists, it is possible that another external object is unobserved. For example, a vehicle may block a portion of a sidewalk. As a result, a pedestrian may be unobserved. Techniques described herein let the vehicle know the probability of an object existing that is unobserved. The scenario-specific operational control evaluation modules can then use the probability in respective solutions for input into the autonomous vehicle operational management controller to traverse the vehicle transportation network.

FIG. 1 is a diagram of an example of a vehicle in which the aspects, features, and elements disclosed herein may be implemented. In the embodiment shown, a vehicle 1000 includes various vehicle systems. The vehicle systems include a chassis 1100, a powertrain 1200, a controller 1300, and wheels 1400. Additional or different combinations of vehicle systems may be used. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor and is operative to provide kinetic energy as a motive force to one or more of the wheels 1400. Alternatively or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, transmits the energy to the wheels 1400 to provide a motive force. The transmission 1220 may be controlled by the controller 1300, the actuator 1240, or both. The steering unit 1230 may be controlled by the controller 1300, the actuator 1240, or both and control the wheels 1400 to steer the vehicle. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short-range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a Global Positioning System (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that may be used to control the vehicle. The sensors 1360 may be an array of sensors. The sensors 1360 may provide information regarding current operating characteristics of the vehicle 1000, including vehicle operational information. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 1000.

The sensors 1360 include one or more sensors 1360 that are operable to obtain information regarding the physical environment surrounding the vehicle 1000, such as operational environment information. For example, one or more sensors may detect road geometry, such as lane lines, and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
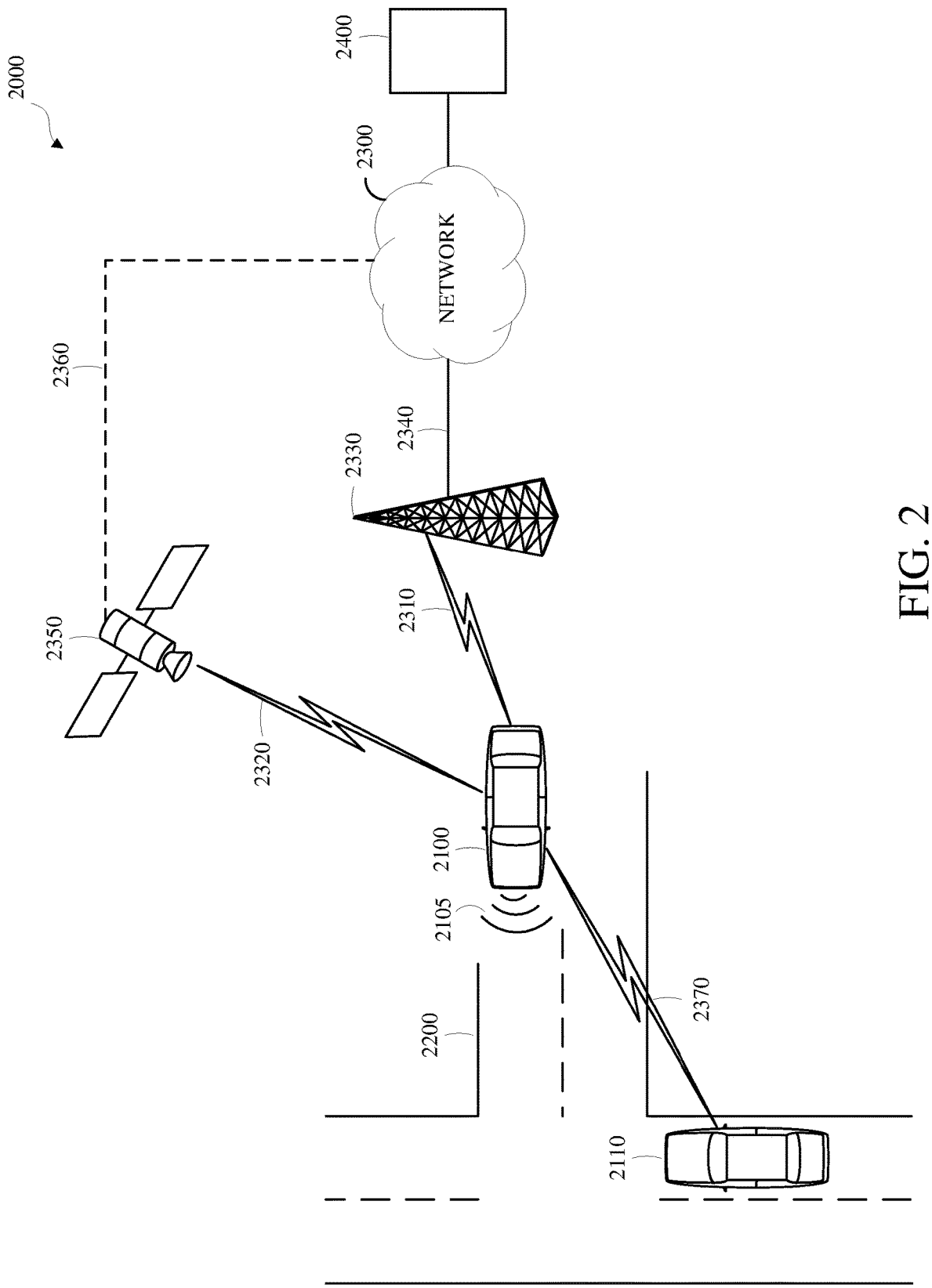
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may identify a portion or condition of the vehicle transportation network 2200. For example, the vehicle includes at least one on-vehicle sensor 2105, like the sensor 1360 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
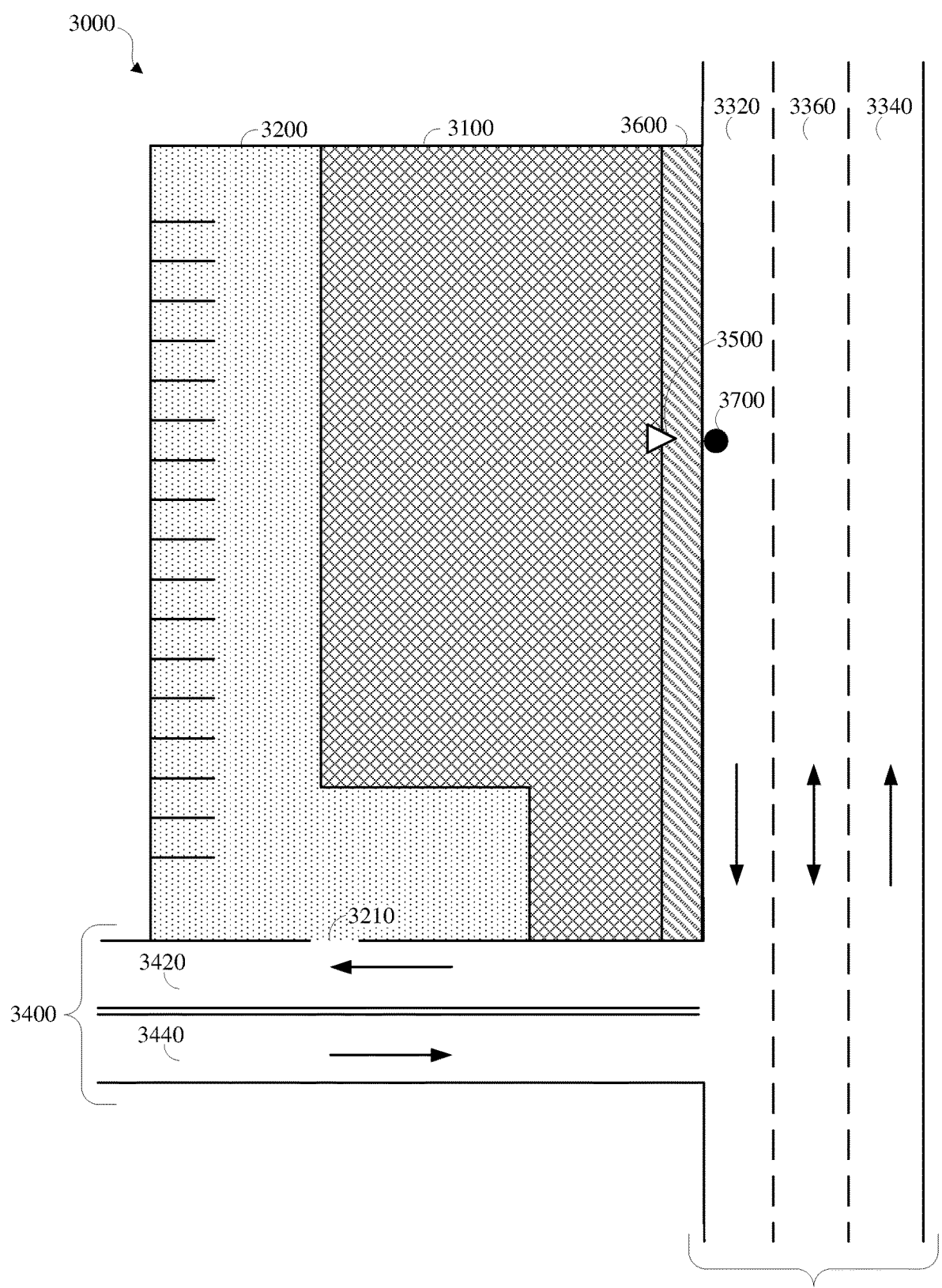
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, a number of lanes, known hazards, or a combination thereof.

The vehicle transportation network may be associated with or may include a pedestrian transportation network. For example, FIG. 3 includes a portion 3600 of a pedestrian transportation network, which may be a pedestrian walkway. Although not shown separately in FIG. 3, a pedestrian navigable area, such as a pedestrian walkway or crosswalk, may correspond with a navigable area, or a partially navigable area, of a vehicle transportation network.

In some embodiments, a portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Traversing a portion of the vehicle transportation network may proceed from a topological location estimate of the vehicle to a destination. The destination may be a discrete uniquely identifiable geolocation. For example, the vehicle transportation network may include a defined location, such as a street address, a postal address, a vehicle transportation network address, a GPS address, or a combination thereof for the destination. A destination may be associated with one or more entrances, such as the entrance 3500 shown in FIG. 3. A destination may be associated with one or more docking locations, such as the docking location 3700 shown in FIG. 3. A docking location 3700 may be a designated or undesignated location or area in proximity to a destination at which a vehicle may stop, stand, or park such that docking operations, such as passenger loading or unloading, may be performed.

Figure 4:
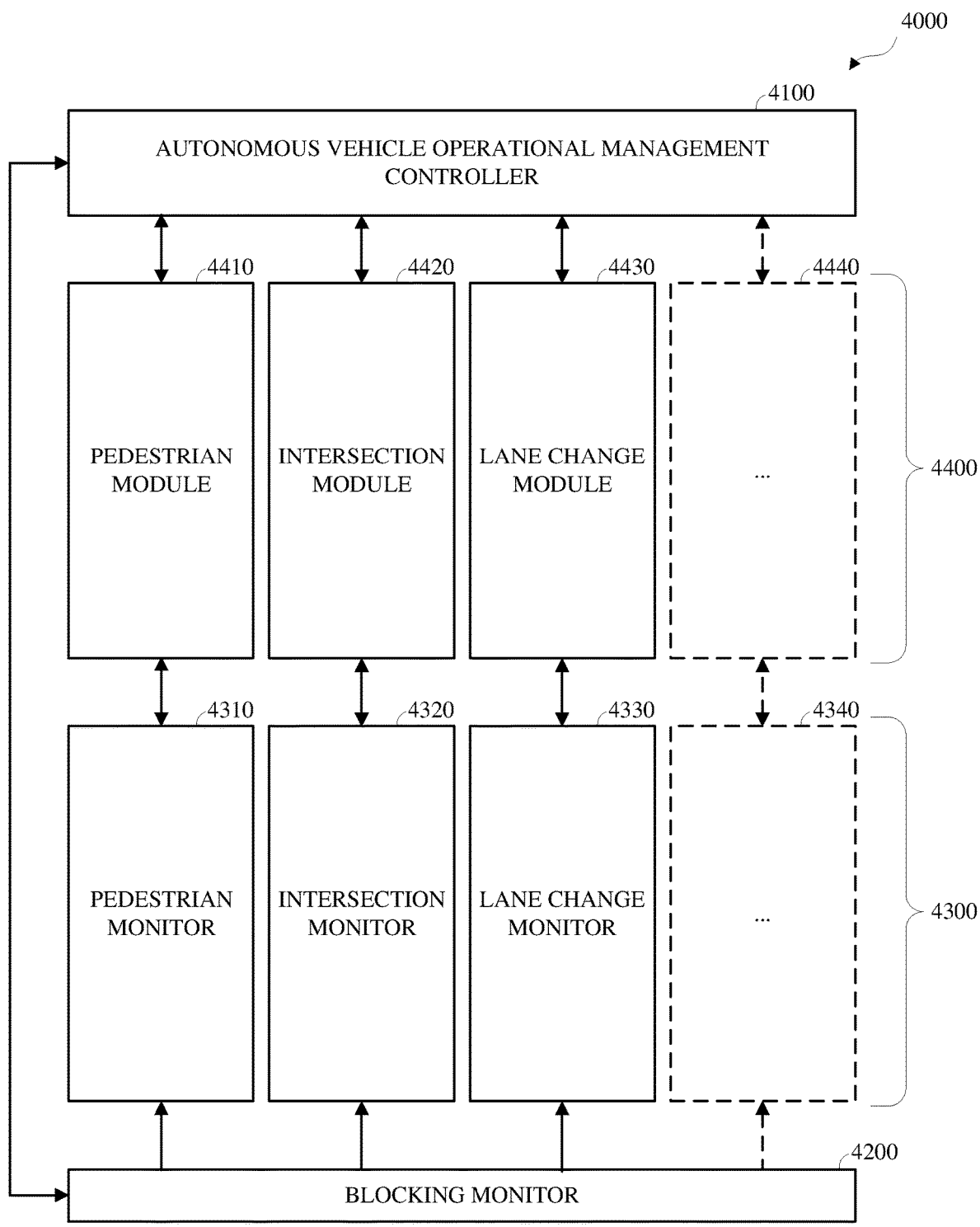
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

An autonomous vehicle may traverse a vehicle transportation network, or a portion thereof, which may include traversing distinct vehicle operational scenarios. A distinct vehicle operational scenario (also called a scenario herein) may include any distinctly identifiable set of operative conditions that may affect the operation of the autonomous vehicle within a defined spatiotemporal area, or operational environment, of the autonomous vehicle. A distinct vehicle operational scenario may be based on a number or cardinality of roads, road segments, or lanes that the autonomous vehicle may traverse within a defined spatiotemporal distance. A distinct vehicle operational scenario may be based on one or more traffic control devices that may affect the operation of the autonomous vehicle within a defined spatiotemporal area, or operational environment, of the autonomous vehicle. A distinct vehicle operational scenario may be based on one or more identifiable rules, regulations, or laws that may affect the operation of the autonomous vehicle within a defined spatiotemporal area, or operational environment, of the autonomous vehicle. A distinct vehicle operational scenario may be based on one or more identifiable external objects that may affect the operation of the autonomous vehicle within a defined spatiotemporal area, or operational environment, of the autonomous vehicle.

Examples of distinct vehicle operational scenarios including a distinct vehicle operational scenario wherein the autonomous vehicle is traversing an intersection; a distinct vehicle operational scenario wherein a pedestrian is crossing, or approaching, the expected path of the autonomous vehicle; and a distinct vehicle operational scenario wherein the autonomous vehicle is changing lanes. A distinct vehicle operational scenario may separately include merging lanes, or the distinct vehicle operational scenario wherein the autonomous vehicle is changing lanes may also include merging lanes.

For simplicity and clarity, similar vehicle operational scenarios may be described herein with reference to vehicle operational scenario types or classes. A type or class of a vehicle operational scenario may refer to a particular pattern or set of patters on the scenario. For example, vehicle operational scenarios including pedestrians may be referred to herein as pedestrian scenarios referring to the types or classes of vehicle operational scenarios that include pedestrians. As an example, a first pedestrian vehicle operational scenario may include a pedestrian crossing a road at a crosswalk and as second pedestrian vehicle operational scenario may include a pedestrian crossing a road by jaywalking. Although pedestrian vehicle operational scenarios, intersection vehicle operational scenarios, and lane change vehicle operational scenarios are described herein, any other vehicle operational scenario or vehicle operational scenario type may be used.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

An autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

Controlling the autonomous vehicle to traverse the distinct vehicle operational scenarios may include identifying or detecting the distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network.

The autonomous vehicle operational management controller 4100, or another unit of the autonomous vehicle, may control the autonomous vehicle to traverse the vehicle transportation network, or a portion thereof, in accordance with a vehicle control action. Examples of vehicle control actions include a 'stop' vehicle control action that stops or otherwise controls the autonomous vehicle to become or remain stationary, an 'advance' vehicle control action that moves the autonomous vehicle forward slowly for a short distance, such as a few inches or a foot, an 'accelerate' vehicle control action that accelerates the autonomous vehicle (e.g., at a defined acceleration rate or within a defined range), a 'decelerate' vehicle control action that decelerates the autonomous vehicle (e.g., at a defined deceleration rate or within a defined range), a 'maintain' vehicle control action that maintains the current operational parameters (e.g., a current velocity, a current path or route, a current lane orientation, etc.), a 'turn' vehicle control action (which may include an angle of a turn), a 'proceed' vehicle control action that begins or resumes a previously identified set of operational parameters, or any other standard vehicle operation.

A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The autonomous vehicle operational management system 4000 may include an autonomous vehicle operational management controller 4100, a blocking monitor 4200, operational environment monitors 4300, SSOCEMs 4400, or a combination thereof. Although described separately, the blocking monitor 4200 may be an instance, or instances, of an operational environment monitor 4300.

The autonomous vehicle operational management controller 4100 may receive, identify, or otherwise access, operational environment information representing an operational environment for the autonomous vehicle, such as a current operational environment or an expected operational environment, or one or more aspects thereof. The operational environment of the autonomous vehicle may include a distinctly identifiable set of operative conditions that may affect the operation of the vehicle within a defined spatiotemporal area of the vehicle.

The operational environment information may include vehicle information for the autonomous vehicle, such as information indicating a geospatial location of the vehicle, information correlating the geospatial location to information representing the vehicle transportation network, a route of the vehicle, a speed of the vehicle, an acceleration state of the vehicle, passenger information of the vehicle, or any other information about the vehicle or the operation of the vehicle.

The operational environment information may include information representing the vehicle transportation network proximate to the autonomous vehicle, such as within a defined spatial distance (e.g., 300 meters) of the vehicle, information indicating the geometry of one or more aspects of the vehicle transportation network, information indicating a condition, such as a surface condition, of the vehicle transportation network, or any combination thereof.

The operational environment information may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the vehicle.

The autonomous vehicle operational management controller 4100 may monitor the operational environment of the autonomous vehicle, or defined aspects thereof. Monitoring the operational environment may include identifying and tracking external objects, identifying distinct vehicle operational scenarios, or a combination thereof.

For example, the autonomous vehicle operational management controller 4100 may identify and track external objects with the operational environment of the autonomous vehicle. Identifying and tracking the external objects may include identifying spatiotemporal locations of respective external objects, which may be relative to the vehicle, identifying one or more expected paths for respective external objects, which may include identifying a speed, a trajectory, or both, for an external object. Descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both.

The operational environment monitors 4300 may include a pedestrian operational environment monitor 4310, an intersection operational environment monitor 4320, a lane change operational environment monitor 4330, or a combination thereof. An operational environment monitor 4340 is shown using broken lines to indicate that the autonomous vehicle operational management system 4000 may include any number of operational environment monitors 4300.

One or more distinct vehicle operational scenarios may be monitored by a respective operational environment monitor 4300. For example, the pedestrian operational environment monitor 4310 may monitor operational environment information corresponding to multiple pedestrian vehicle operational scenarios, the intersection operational environment monitor 4320 may monitor operational environment information corresponding to multiple intersection vehicle operational scenarios, and the lane change operational environment monitor 4330 may monitor operational environment information corresponding to multiple lane change vehicle operational scenarios.

An operational environment monitor 4300 may receive, or otherwise access, operational environment information, such as operational environment information generated or captured by one or more sensors of the autonomous vehicle, vehicle transportation network information, vehicle transportation network geometry information, or a combination thereof. For example, the pedestrian operational environment monitor 4310 may receive, or otherwise access, information, such as sensor data, which may indicate, correspond to, or may otherwise be associated with, one or more pedestrians in the operational environment of the autonomous vehicle.

An operational environment monitor 4300 may associate the operational environment information, or a portion thereof, with the operational environment, or an aspect thereof, such as with an external object, such as a pedestrian, a remote vehicle, an aspect of the vehicle transportation network geometry, or the like.

An operational environment monitor 4300 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment information.

An operational environment monitor 4300 may output the information representing the one or more aspects of the operational environment to, or for access by, the autonomous vehicle operational management controller 4100, such as by storing the information representing the one or more aspects of the operational environment in a memory, such as the memory 1340 shown in FIG. 1, of the autonomous vehicle accessible by the autonomous vehicle operational management controller 4100, sending the information representing the one or more aspects of the operational environment to the autonomous vehicle operational management controller 4100, or a combination thereof. An operational environment monitor 4300 may output the information representing the one or more aspects of the operational environment to one or more elements of the autonomous vehicle operational management system 4000, such as the blocking monitor 4200.

The pedestrian operational environment monitor 4310 may correlate, associate, or otherwise process the operational environment information to identify, track, or predict actions of one or more pedestrians. For example, the pedestrian operational environment monitor 4310 may receive information, such as sensor data, from one or more sensors, which may correspond to one or more pedestrians. The pedestrian operational environment monitor 4310 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian operational environment monitor 4310 may output the identified, associated, or generated pedestrian information to, or for access by, the autonomous vehicle operational management controller 4100.

The intersection operational environment monitor 4320 may correlate, associate, or otherwise process the operational environment information to identify, track, or predict actions of one or more remote vehicles in the operational environment of the autonomous vehicle, to identify an intersection, or an aspect thereof, in the operational environment, to identify vehicle transportation network geometry, or a combination thereof. For example, the intersection operational environment monitor 4320 may receive information, such as sensor data, from one or more sensors, which may correspond to one or more remote vehicles in the operational environment, the intersection, or one or more aspects thereof, in the operational environment, the vehicle transportation network geometry, or a combination thereof. The intersection operational environment monitor 4320 may associate the sensor data with one or more identified remote vehicles in the operational environment, the intersection, or one or more aspects thereof, in the operational environment, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and the intersection operational environment monitor 4320 may output the identified, associated, or generated intersection information to, or for access by, the autonomous vehicle operational management controller 4100.

The lane change operational environment monitor 4330 may correlate, associate, or otherwise process the operational environment information to identify, track, or predict actions of one or more remote vehicles in the operational environment of the autonomous vehicle, such as information indicating a slow or stationary remote vehicle along the expected path of the vehicle, to identify one or more aspects of the operational environment, such as vehicle transportation network geometry in the operational environment, or a combination thereof geospatially corresponding to a current or expected lane change operation. For example, the lane change operational environment monitor 4330 may receive information, such as sensor data, from one or more sensors, which may correspond to one or more remote vehicles in the operational environment of the autonomous vehicle, one or more aspects of the operational environment, or a combination thereof geospatially corresponding to a current or expected lane change operation. The lane change operational environment monitor 4330 may associate the sensor data with one or more identified remote vehicles in the operational environment of the autonomous vehicle, one or more aspects of the operational environment, or a combination thereof geospatially corresponding to a current or expected lane change operation, which may include identifying a current or expected direction of travel, a path, such as an expected path, a current or expected velocity, a current or expected acceleration rate, or a combination thereof for one or more of the respective identified remote vehicles. The lane change operational environment monitor 4330 may output the identified, associated, or generated lane change information to, or for access by, the autonomous vehicle operational management controller 4100.

The autonomous vehicle operational management controller 4100 may identify one or multiple distinct vehicle operational scenarios based on one or more aspects of the operational environment represented by the operational environment information. The autonomous vehicle operational management controller 4100 may identify a distinct vehicle operational scenario in response to identifying, or based on, the operational environment information indicated by one or more of the operational environment monitors 4300. For example, the operational environment information may include information representing a pedestrian approaching an intersection along an expected path for the autonomous vehicle, and the autonomous vehicle operational management controller 4100 may identify a pedestrian vehicle operational scenario, an intersection vehicle operational scenario, or both.

The autonomous vehicle operational management controller 4100 may instantiate respective instances of one or more of the SSOCEMs 4400 based on one or more aspects of the operational environment represented by the operational environment information. For example, the autonomous vehicle operational management controller 4100 may instantiate a respective instance of a SSOCEM 4400 in response to identifying an upcoming scenario. An upcoming scenario may be a distinct vehicle operational scenario that the autonomous vehicle operational management controller 4100 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

A SSOCEM 4400, once instantiated, can receive the operational environment information, including sensor data, to determine and output a candidate vehicle control action, also called a candidate action herein. A candidate action is a vehicle control action that is identified by the particular SSOCEM 4400 as the likely optimal action for the vehicle to perform that will handle a particular scenario. For instance, a SSOCEM 4400 configured to handle intersections (e.g., an intersection SSOCEM 4420) may output a "proceed", a candidate action that suggests proceeding through an intersection. At the same time, a SSOCEM 4400 for handling lane changes (e.g., the lane change SSOCEM 4430) may output a "turn left" candidate action indicating that the vehicle should merge left by two degrees. In some implementations, each SSOCEM 4400 outputs a confidence score indicating a degree of confidence in the candidate action determined by the SSOCEM 4400. For instance, a confidence score greater than 0.95 may indicate a very high confidence in the candidate action, while a confidence score less than 0.5 may indicate a relatively low degree of confidence in the candidate action. Further details of a SSOCEM 4400 are described below.

The autonomous vehicle operational management controller 4100 receives the candidate actions and determines a vehicle control action based on the received candidate actions. In some implementations, the autonomous vehicle operational management controller 4100 utilizes hardcoded logic to determine the vehicle control action. For example, the autonomous vehicle operational management controller 4100 may select the candidate action having the highest confidence score. In other implementations, the autonomous vehicle operational management controller 4100 may select the candidate action that is the least likely to result in a collision. In other implementations, the autonomous vehicle operational management controller 4100 may generate a compound action based on two or more non-conflicting candidate actions (e.g., compounding 'proceed' and 'turn left by two degrees' to result in a vehicle control action that causes the vehicle to veer left and proceed through an intersection). In some implementations, the autonomous vehicle operational management controller 4100 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process, or a Partially Observable Markov Decision Processes, which may describe how respective candidate actions affect subsequent candidate actions affect, and may include a reward function that outputs a positive or negative reward for respective vehicle control actions.

The autonomous vehicle operational management controller 4100 may uninstantiate an instance of a SSOCEM 4400. For example, the autonomous vehicle operational management controller 4100 may identify a distinct set of operative conditions as indicating a distinct vehicle operational scenario for the autonomous vehicle, instantiate an instance of a SSOCEM 4400 for the distinct vehicle operational scenario, monitor the operative conditions, subsequently determine that one or more of the operative conditions has expired, or has a probability of affecting the operation of the autonomous vehicle below a defined threshold, and the autonomous vehicle operational management controller 4100 may uninstantiate the instance of the SSOCEM 4400.

The blocking monitor 4200 may receive operational environment information representing an operational environment, or an aspect thereof, for the vehicle. For example, the blocking monitor 4200 may receive the operational environment information from the autonomous vehicle operational management controller 4100, from a sensor of the vehicle, from an external device, such as a remote vehicle or an infrastructure device, or a combination thereof. The blocking monitor 4200 may read the operational environment information, or a portion thereof, from a memory, such as a memory of the autonomous vehicle, such as the memory 1340 shown in FIG. 1.

The blocking monitor 4200 may determine a respective probability of availability, or corresponding blocking probability, for one or more portions of the vehicle transportation network. The portions may include those portions of the vehicle transportation network corresponding to an expected path of the autonomous vehicle.

A probability of availability, or corresponding blocking probability, may indicate a probability or likelihood that the autonomous vehicle will traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 4200 may identify a respective probability of availability for each of multiple portions of the vehicle transportation network within an operational environment, such as within 300 meters of the autonomous vehicle.

A probability of availability may be indicated by the blocking monitor 4200 corresponding to each external object in the operational environment of the autonomous vehicle and a geospatial area may be associated with multiple probabilities of availability corresponding to multiple external objects. An aggregate probability of availability may be indicated by the blocking monitor 4200 corresponding to each type of external object in the operational environment of the autonomous vehicle, such as a probability of availability for pedestrians and a probability of availability for remote vehicles, and a geo spatial area may be associated with multiple probabilities of availability corresponding to multiple external object types.

The blocking monitor 4200 may identify external objects, track external objects, project location information, path information, or both for external objects, or a combination thereof. For example, the blocking monitor 4200 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 4200 may communicate probabilities of availability, or corresponding blocking probabilities, to the autonomous vehicle operational management controller 4100. The autonomous vehicle operational management controller 4100 may communicate the probabilities of availability, or corresponding blocking probabilities, to respective instantiated instances of the scenario-specific operational control evaluation modules 4400.

Although not expressly shown in FIG. 4, the autonomous vehicle operational management system 4000 may include a predictor module that may generate and send prediction information to the blocking monitor 4200, and the blocking monitor 4200 may output probability of availability information to one or more of the operational environment monitors 4300.

Each SSOCEM 4400 may model a respective distinct vehicle operational scenario. The autonomous vehicle operational management system 4000 includes any number of SSOCEMs 4400, each modeling a respective distinct vehicle operational scenario. Modeling a distinct vehicle operational scenario may include generating and/or maintaining state information representing aspects of an operational environment of the vehicle corresponding to the distinct vehicle operational scenario, identifying potential interactions among the modeled aspects respective of the corresponding states, and determining a candidate action that solves the model. Stated more simply, a SSOCEM 4400 may include one or more models that are configured to determine one or more vehicle control actions for handling a scenario given a set of inputs. The models may include, but are not limited to, Partially Observable Markov Decision Process (POMDP) models, Markov Decision Process (MDP) models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 4400 includes computer-executable instructions that define a manner by which the models operate and a manner by which the models are utilized.

A SSOCEM 4400 may implement a CP model, which may be a single-agent model that models a distinct vehicle operational scenario based on a defined input state. The defined input state may indicate respective non-probabilistic states of the elements of the operational environment of the autonomous vehicle for the distinct vehicle operational scenario. In a CP model, one or more aspects (e.g., geospatial location) of modeled elements (e.g., external objects) that are associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and at an immediately subsequent second temporal location the remote vehicle may have a second geospatial location that differs from the first geospatial location by a defined geospatial distance, such as a defined number of meters, along an expected path for the remote vehicle.

A SSOCEM 4400 may implement a discrete time stochastic control process, such as a MDP model, which may be a single-agent model that model a distinct vehicle operational scenario based on a defined input state. Changes to the operational environment of the autonomous vehicle, such as a change of location for an external object, may be modeled as probabilistic changes. A MDP model may utilize more processing resources and may more accurately model the distinct vehicle operational scenario than a CP model.

A MDP model may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the MDP model, one or more possible subsequent states of the MDP model, or a combination thereof. A state represents an identified condition, which may be an expected condition, of respective defined aspects, such as external objects and traffic control devices, of the operational environment of the vehicle that may probabilistically affect the operation of the vehicle at a discrete temporal location. For example, a remote vehicle operating in the proximity of the vehicle may affect the operation of the vehicle and may be represented in a MDP model. The MDP model may include representing the following identified or expected information for the remote vehicle: its geospatial location, its path, heading, or both, its velocity, its acceleration or deceleration rate, or a combination thereof corresponding to a respective temporal location. At instantiation, the current state of the MDP model may correspond to a contemporaneous state or condition of the operating environment.

Although any number or cardinality of states may be used, the number or cardinality of states included in a model may be limited to a defined maximum number of states. For example, a model may include the 300 most probable states for a corresponding scenario.

The set of actions may include vehicle control actions available to the MDP model at each state in the set of states. A respective set of actions may be defined for each distinct vehicle operational scenario.

The set of state transition probabilities may probabilistically represent potential or expected changes to the operational environment of the vehicle, as represented by the states, responsive to the actions. For example, a state transition probability may indicate a probability that the operational environment corresponds to a respective state at a respective temporal location immediately subsequent to a current temporal location corresponding to a current state in response to traversing the vehicle transportation network by the vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

The reward function may determine a respective positive or negative (cost) value accrued for each combination of state and action. This accrual represents an expected value of the vehicle traversing the vehicle transportation network from the corresponding state in accordance with the corresponding vehicle control action to the subsequent state.

The reward function may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

A SSOCEM 4400 may implement a POMDP model, which may be a single-agent model. A POMDP model is similar to a MDP model, except that a POMDP model includes modeling uncertain states. A POMDP model may include modeling confidence, sensor trustworthiness, distraction, noise, uncertainty, such as sensor uncertainty, or the like. A POMDP model may utilize more processing resources and may more accurately model the distinct vehicle operational scenario than a MDP model.

A POMDP model may model a distinct vehicle operational scenario using a set of states, a set of states, a set of actions, a set of state transition probabilities, a reward function, a set of observations, a set of conditional observation probabilities, or a combination thereof. The set of states, the set of actions, the set of state transition probabilities, and the reward function may be similar to those described above with respect to the MDP model.

The set of observations may include observations corresponding to respective states. An observation may provide information about the attributes of a respective state. An observation may correspond with a respective temporal location. An observation may include operational environment information, such as sensor data. An observation may include expected or predicted operational environment information.

For example, a POMDP model may include an autonomous vehicle at a first geospatial location and first temporal location corresponding to a first state. The model may indicate that the vehicle identify and perform, or attempt to perform, a vehicle control action to traverse the vehicle transportation network from the first geospatial location to a second geospatial location at a second temporal location immediately subsequent to the first temporal location. The set of observations corresponding to the second temporal location may include the operational environment information that is identified corresponding to the second temporal location, such as geospatial location information for the vehicle, geospatial location information for one or more external objects, probabilities of availability, expected path information, or the like.

The set of conditional observation probabilities may include probabilities of making respective observations based on the operational environment of the autonomous vehicle. For example, the autonomous vehicle may approach an intersection by traversing a first road, contemporaneously, a remote vehicle may approach the intersection by traversing a second road, the autonomous vehicle may identify and evaluate operational environment information, such as sensor data, corresponding to the intersection, which may include operational environment information corresponding to the remote vehicle. The operational environment information may be inaccurate, incomplete, or erroneous. In a MDP model, the autonomous vehicle may non-probabilistically identify the remote vehicle, which may include identifying its location, an expected path, or the like, and the identified information, such as the identified location, based on inaccurate operational environment information, may be inaccurate or erroneous. In a POMDP model, the autonomous vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle.

The set of conditional observation probabilities may be identified based on the operational environment information, such as the operational environment information described with respect to the reward function.

A SSOCEM 4400 may implement a Dec-POMDP model, which may be a multi-agent model that models a distinct vehicle operational scenario. A Dec-POMDP model may be similar to a POMDP model except that a POMDP model models the vehicle and a proper subset, such as of the external objects, and a Dec-POMDP models the autonomous vehicle and the set of external objects.

A SSOCEM 4400 may implement a POSG model, which may be a multi-agent model that models a distinct vehicle operational scenario. A POSG model may be similar to a Dec-POMDP except that the Dec-POMDP model includes a reward function for the vehicle and the POSG model includes the reward function for the vehicle and a respective reward function for each external object.

A SSOCEM 4400 may implement a RL model, which may be a learning model that models a distinct vehicle operational scenario. A RL model may be similar to a MDP model or a POMDP model except that defined state transition probabilities, observation probabilities, a reward function, or any combination thereof, may be omitted from the model. Instead, for example, the RL model may be a model-based RL model that generates state transition probabilities, observation probabilities, a reward function, or any combination thereof based on one or more modeled or observed events.

In a RL model, the model may evaluate one or more events or interactions, which can include simulated events, and may generate, or modify, a corresponding model, or a solution thereof, in response to the respective event. Simulated events may include, for example, traversing an intersection, traversing a vehicle transportation network near a pedestrian, or changing lanes. An example of using a RL model to traverse an intersection includes the RL model indicating a candidate action for traversing the intersection. The autonomous vehicle then traverses the intersection using the candidate action as the vehicle control action for a temporal location. A result of traversing the intersection using the candidate action may be determined to update the RL model based on the result.

The autonomous vehicle operational management system 4000 may include any number or combination of types of models. For example, the pedestrian SSOCEM 4410, the intersection SSOCEM 4420, and the lane change SSOCEM 4430 may implement POMDP models. In another example, the pedestrian SSOCEM 4410 may implement a MDP model and the intersection SSOCEM 4420 and the lane change SSOCEM 4430 may implement POMDP models. Further, the autonomous vehicle operational management controller 4100 may instantiate any number of instances of the SSOCEMs 4400 based on the operational environment information. A module 4440 is shown using broken lines to indicate that the autonomous vehicle operational management system 4000 may include any number or additional types of SSOCEMs 4400.

One or more of the autonomous vehicle operational management controller 4100, the blocking monitor 4200, the operational environment monitors 4300, or the SSOCEMs 4400, may operate continuously or periodically, such as at a frequency of ten hertz (10 Hz). For example, the autonomous vehicle operational management controller 4100 may identify a vehicle control action many times, such as ten times, per second. The operational frequency of each component of the autonomous vehicle operational management system 4000 may be synchronized or unsynchronized, and the operational rate of one or more of the autonomous vehicle operational management controller 4100, the blocking monitor 4200, the operational environment monitors 4300, or the SSOCEMs 4400 may be independent of the operational rate of others.

Figure 5:
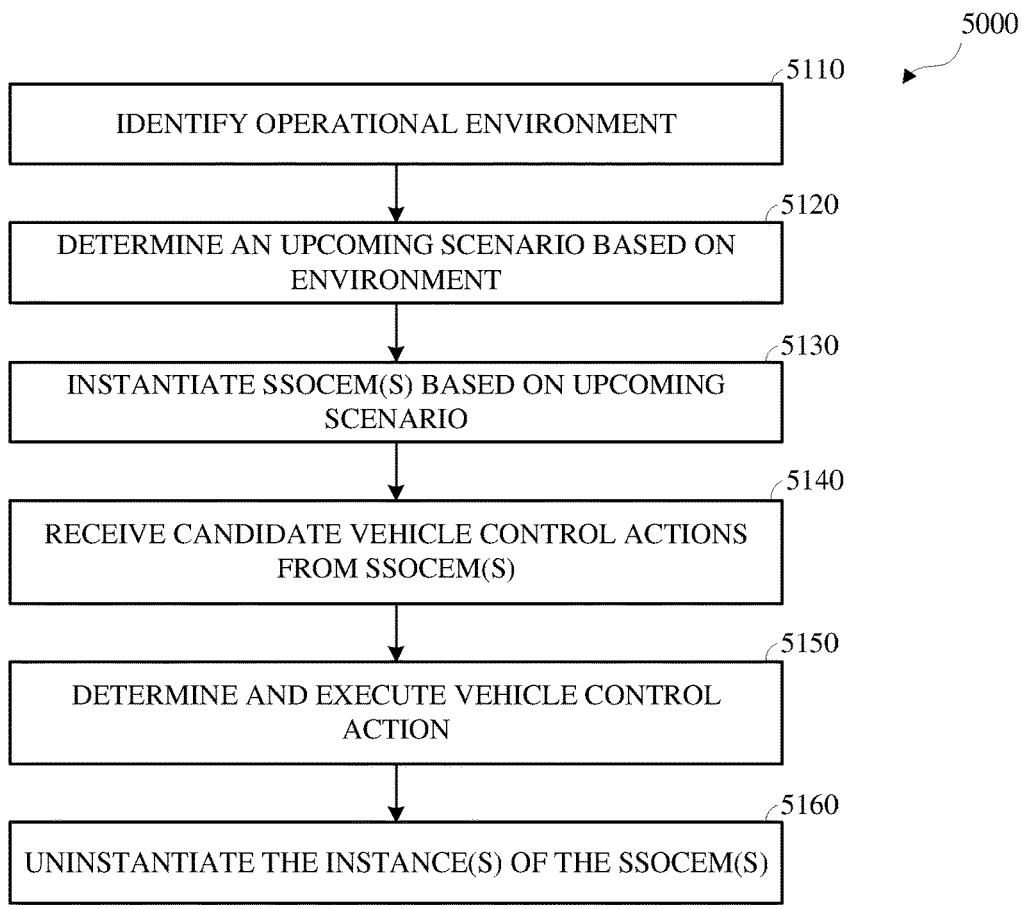
FIG. 5 is a flow chart diagram of an example of a process for controlling the operation of a vehicle in accordance with embodiments of this disclosure.

FIG. 5 is a flow chart diagram of an example of a process 5000 for controlling the operation of a vehicle in accordance with embodiments of this disclosure. The process 5000 of FIG. 5 is described with respect to the autonomous vehicle operational management controller 4100. The process 5000 may, however, be executed by any other suitable component.

Although not shown separately in FIG. 5, the autonomous vehicle operational management controller 4100 may identify the operational environment of the autonomous vehicle, or defined aspects thereof, at 5110 while traveling along a route from a current location to a destination. Identifying the operational environment at 5110 can include identifying and tracking external objects.

The identified operational environment may include vehicle information for the vehicle, information representing the vehicle transportation network proximate to the vehicle, information representing external objects, etc. The autonomous vehicle operational management controller 4100 may identify the operational environment at 5110 based on sensor data, such as from the sensor 1360 shown in FIG. 1 or the on-vehicle sensors 2105 shown in FIG. 2, vehicle transportation network information, previously identified operational environment information, or any other information or combination of information describing an aspect or aspects of the operational environment.

An external object indicated by the sensor data may be indeterminate, and the autonomous vehicle operational management controller 4100 may identify object information, such as an object type, based on the sensor data, other information, such as information from another sensor, information corresponding to a previously identified object, or a combination thereof. The sensor, or another unit of the vehicle may identify the object information and may send the object identification information to the autonomous vehicle operational management controller 4100.

At 5120, the autonomous vehicle operational management controller 4100 determines an upcoming scenario. The autonomous vehicle operational management controller 4100 may determine an upcoming scenario by detecting an upcoming scenario itself or may pass the operational environment to one or more of the operational environment monitors 4300 and receive an upcoming scenario detected by a respective operational environment monitor 4300.

Where the autonomous vehicle operational management controller 4100 is used to detect an upcoming scenario, the autonomous vehicle operational management controller 4100 may include one or more scenario-specific monitor module instances. For example, the autonomous vehicle operational management controller 4100 may include such instances for monitoring pedestrians, intersections, lane changes, or a combination thereof. Each scenario-specific monitor module instance may use the operational environment information to determine an upcoming scenario by, for example, identifying whether a pedestrian is within a defined distance of the vehicle, whether the vehicle is approaching an intersection, a crosswalk, or both, whether the vehicle is traveling in a passing lane, etc.

Where the autonomous vehicle operational management controller 4100 passes the operational environment to one or more of the operational environment monitors 4300, similar processing occurs. For instance, the intersection operational environment monitor 4320 may identify, for an upcoming intersection, a type of intersection. For example, the intersection operational environment monitor 4320 may determine the number of roads intersecting, the right of way (if any), whether there are stop signs or traffic signals, and whether there is a crosswalk at the intersection. Each operational environment monitor 4300 may output zero or more upcoming scenarios to the autonomous vehicle operational management controller 4100. Each upcoming scenario may include a geolocation of the upcoming scenario and a type of the upcoming scenario. In some implementations, the type of the upcoming scenario may include one or more data fields that define the features of the upcoming scenario.

In some situations during travel, the autonomous vehicle operational management controller 4100 determines multiple distinct vehicle operational scenarios, which may be aspects of a compound vehicle operational scenario, at 5120. For example, the operational environment information may include information representing a pedestrian approaching an intersection along an expected path for the vehicle, so a pedestrian vehicle operational scenario, an intersection vehicle operational scenario, or both are determined at 5120. The operational environment may include multiple external objects such that the autonomous vehicle operational management controller 4100 identifies a distinct vehicle operational scenario corresponding to each external object at 5120.

At 5130, the autonomous vehicle operational management controller 4100 instantiates one or more SSOCEMs 4400 based on the upcoming scenario(s). In instantiating a SSOCEM 4400, the autonomous vehicle operational management controller 4100 may pass the geolocation of the upcoming scenario, the current location of the vehicle, and a type of the upcoming scenario to the instance of the SSOCEM 4400. Where more than one SSOCEM 4400 is instantiated at 5130, each SSOCEM instance can correspond to a respective distinct vehicle operational scenario determined at 5120, or a combination of a distinct external object identified in the operational environment at 5110 and a respective distinct vehicle operational scenario determined at 5120.

Although not shown in FIG. 5, the autonomous vehicle operational management controller 4100 may send the operational environment for the vehicle identified at 5110 to a blocking monitor, such as the blocking monitor 4200. The blocking monitor 4200 may then in turn determine a respective probability of availability, or corresponding blocking probability, for one or more portions of the vehicle transportation network, such as portions of the vehicle transportation network corresponding to an expected path of the vehicle (e.g., an expected path identified based on a current route of the autonomous vehicle), an expected path for one or more external objects, etc., and send the probabilities for use in the instantiated SSOCEM(s).

At 5140, the autonomous vehicle operational management controller 4100 receives a candidate action from one or more of the instantiated SSOCEMs. As each SSOCEM may be configured to handle a specific scenario, different SSOCEMs may provide different candidate actions. For instance, a first SSOCEM instance may output a candidate action to stop the vehicle, while a second SSOCEM instance may output a candidate action to decelerate the vehicle.

The SSOCEM instance(s) may solve a model of a corresponding distinct vehicle operational scenario to provide the candidate actions. Solving the model depends on the type of model. For example, where the model for a SSOCEM instance is a POMDP, the solution may determine a set of possible states and state transitions that correspond to vehicle control actions. A model may be considered fully solved when the model converges. A POMDP is defined by a tuple $<S, A, \Omega, T, O, R>$, where S is the set of possible states, A is a set of possible actions, and $\Omega$ is a set of observations. T: $S \times A \times S \rightarrow [0, 1]$ describes how the environmental states change dynamically with respect to the actions taken by the vehicle. $O: A \times S \times \Omega \rightarrow [0, 1]$ describes how observations are stochastically produced by new environment states once an action has been taken by the vehicle. R is the reward function, which may be defined as a unit cost for all states, except the goal state. Given the definition of a POMDP, the SSOCEM instance may solve the POMDP by constructing a policy that maximizes an objective function (such as avoiding a pedestrian that may wish to cross the path of the vehicle, or traversing an intersection in the presence of an external objects, such as a remote vehicle). The objective function combines partial rewards (at each step) over multiple steps. At each step, the SSOCEM instance determines whether a state transition, which may be a transition from one state to another state resulting from an action, results in a reward or a penalty. This determination (i.e., reward or penalty) may be used to update the objective function (e.g., decrement the objective function in the case of a penalty and increment the objective function in the case of reward). Thus, the SSOCEM instance iterates through all the possible state transitions while updating the objective function at each step. At each step (or every nth step), the SSOCEM instance can determine whether the objective function is increasing, decreasing, or remaining relatively flat. After observing little or no change in the objective function over multiple steps, the SSOCEM 4400 determines that the solution to the POMDP has converged. The output may comprise the candidate action(s) sent to the autonomous vehicle operational management controller 4100.

At 5150, the autonomous vehicle operational management controller 4100 determines and executes a vehicle control action. The autonomous vehicle operational management controller 4100 may utilize any suitable technique to determine a vehicle control action based on the one or more candidate actions. The autonomous vehicle operational management controller 4100 may implement hard-coded instructions to determine a vehicle control action. For instance, each candidate vehicle control action may have a confidence score associated therewith, and the autonomous vehicle operational management controller 4100 may be configured to select the candidate vehicle control action having the highest confidence score. The autonomous vehicle operational management controller 4100 may select the candidate vehicle control action that is the least likely to cause a collision. The autonomous vehicle operational management controller 4100 may utilize a machine learned model to select the vehicle control action from a set of candidate actions. The autonomous vehicle operational management controller 4100 may group of the candidate actions, and select one or more candidate actions having a highest count as the vehicle control action.

However the vehicle control action is determined, the autonomous vehicle operational management controller 4100 may execute the vehicle control action. For example, the autonomous vehicle operational management controller 4100 may determine one or more commands for one or more of the vehicle systems (e.g., the chassis system, braking system, steering system, and/or propulsion systems) to perform. Once determined, the autonomous vehicle operational management controller 4100 may issue the determined commands to the respective vehicle systems.

At 5160, the autonomous vehicle operational management controller 4100 may uninstantiate the instance(s) of the SSOCEM(s). Once a particular scenario is handled, the autonomous vehicle operational management controller may uninstantiate any instances of SSOCEMs that were instantiated to handle the scenario. For example, the intersection SSOCEM 4420 may be instantiated when the distance of the autonomous vehicle to the intersection is 50 meters and may be uninstantiated when the vehicle is on the other side of the intersection. As another example, the pedestrian SSOCEM 4410 may be instantiated when the autonomous vehicle approaches a pedestrian or an occluded region of interest (as discussed in additional detail with regards to FIG. 6) and may be uninstantiated when the vehicle has passed the pedestrian or region. As yet another example, the lane change SSOCEM 4430 may be instantiated when the route of the autonomous vehicle requires a lane change, or there is a region-specific preference for a certain lane and may be uninstantiated once the lane change is complete, or the road/route/location changes to make a lane change unnecessary.

Although not expressly shown in FIG. 5, the autonomous vehicle operational management controller 4100 may continuously or periodically repeat identifying or updating the operational environment information at 5110 to determine when a distinct vehicle operational scenario is resolved and hence may be uninstantiated at 5160, or to determine whether a new scenario has appeared that makes the addition of a further SSOCEM instance desirable. To the extent a scenario remains unresolved, the operational environment information may be transmitted to the SSOCEM instances.

Figure 6:
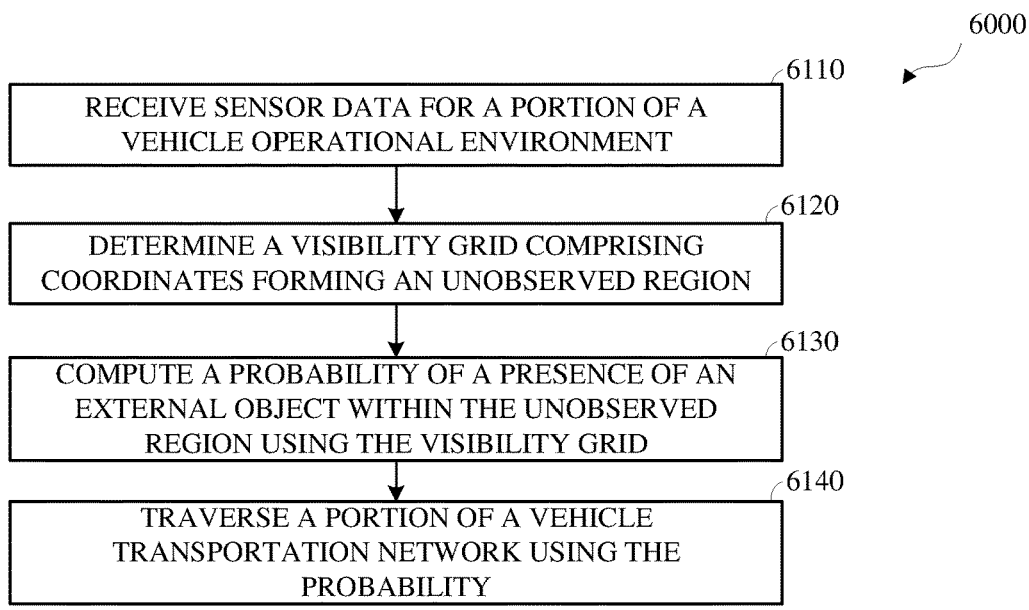
FIG. 6 is a flow chart diagram of a process of traversing a vehicle transportation network using explicit reasoning for occlusions in accordance with embodiments of this disclosure.

As mentioned above, the normal range of a vehicle sensor may be occluded. When such an occlusion exists, it is possible that an external object such as a vehicle or a pedestrian is unobserved. A process or method for addressing such occlusions by identifying a probability of the object existing that is unobserved is described with respect to FIG. 6. More specifically, FIG. 6 is a flow chart diagram of a process 6000 of traversing a vehicle transportation network using explicit reasoning for occlusions in accordance with embodiments of this disclosure.

Some or all of the operations of the process 6000 may be implemented by a SSOCEM 4400 that models occlusions, or by another component of the autonomous vehicle operational management system 4000 that provides a probability of the existence of an unobserved object to one or more of the SSOCEMs 4400, such as the pedestrian SSOCEM 4410, the intersection SSOCEM 4420, and/or the lane change SSOCEM 4430 depending upon the class of the unobserved object (e.g., a pedestrian or a remote vehicle). For example, an operational environment monitor 4300 may identify occlusions, may identify or determine a probability that an external object is occluded, or hidden, and may include occluded vehicle probability information in the operational environment information output to the autonomous vehicle operational management controller 4100 that is communicated to a respective SSOCEM 4400. Because a POMDP model, and its other variations described above, allow for the modeling of uncertain states, it is desirable in the SSOCEM 4400 implements one of these models.

At 6110, sensor data for a portion of a vehicle operational environment is received from a sensor of the vehicle. The sensor data may be part of the information for the operational environment that is identified at 5110. The sensor may be a lidar sensor or a depth-sensing camera, for example. Other sensors, such as RADAR or sonar, may be used as the sensor. In some implementations, more than one or multiple types of sensors may be used.

In some situations, an occlusion may exist. An occlusion may be an external object, such as a traffic signs, a building, a tree, an identified external object, or any other operational condition or combination of operational conditions capable of occluding one or more other operational conditions, such as external objects, from the autonomous vehicle at a spatiotemporal location within a sensor range.

At 6120, the process 6000 includes determining, using the sensor data, a visibility grid comprising coordinates forming an unobserved region within a defined distance from the vehicle. An unobserved region may be explained with reference to FIGS. 7 and 8.

Figure 7:
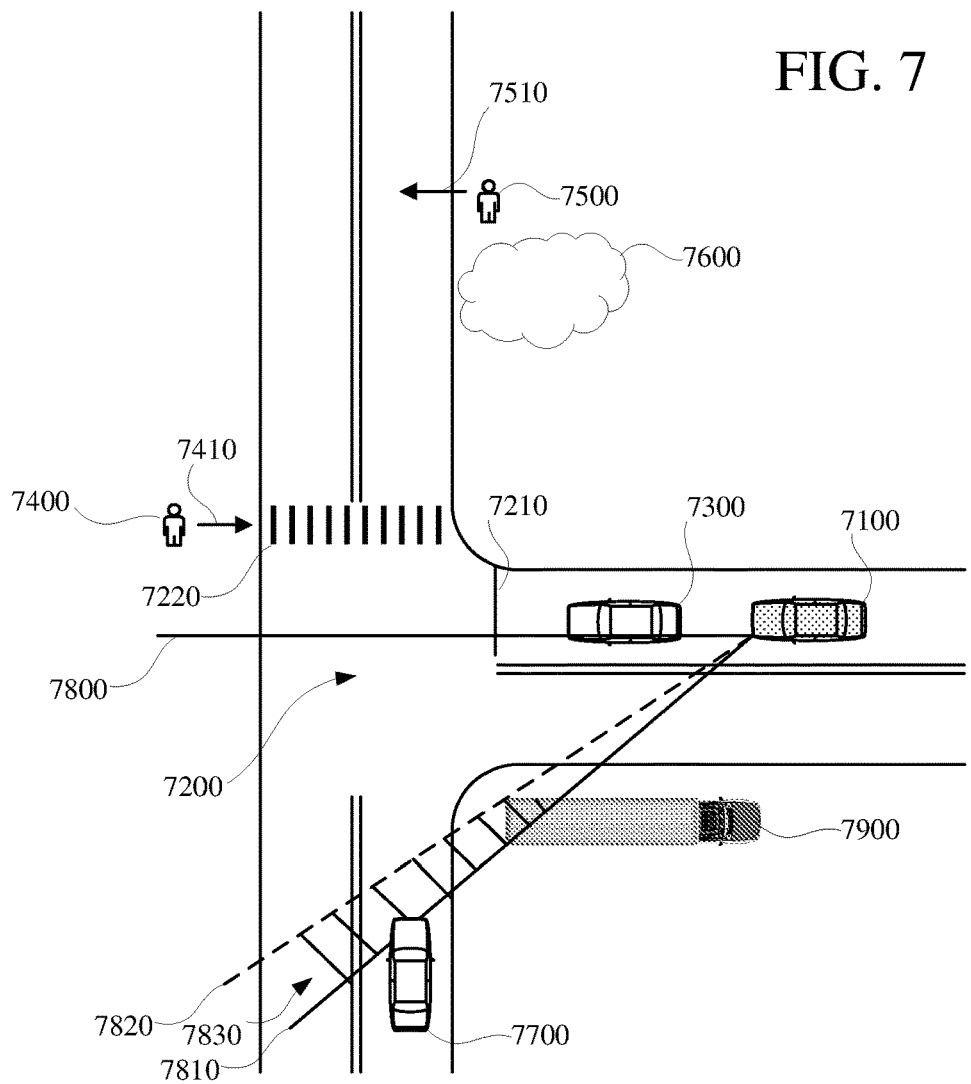
FIG. 7 is a diagram of a pedestrian scenario and of an intersection scenario used to explain the process of FIG. 6.
Figure 8:
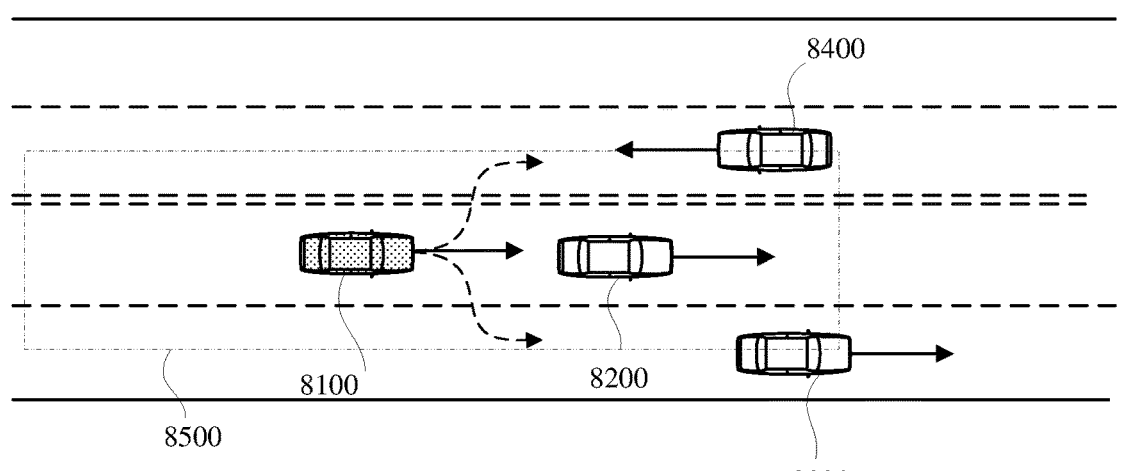
FIG. 8 is a diagram of a lane change scenario used to explain the process of FIG. 6.

FIG. 7 is a diagram of a pedestrian scenario and an intersection scenario used to explain the process 6000 of FIG. 6, and FIG. 8 is a diagram of a lane change scenario used to explain the process 6000 of FIG. 6.

In the diagram of FIG. 7, an autonomous vehicle 7100 is traveling into a T-intersection 7200. The vehicle 7100 is following a remote vehicle 7300 that is approaching a stop line 7210. The T-intersection 7200 includes a crosswalk 7220. Depending upon the spacing of the vehicle 7100 and the remote vehicle 7300, a portion of the crosswalk 7220 and an adjacent portion of the transportation network system may not be detected by a sensor of the vehicle 7100. Together, these portions of the vehicle transportation network form an unobserved region where a pedestrian 7400 may be traveling (i.e., walking or running) in the direction of the arrow 7410 to enter the crosswalk 7220. After the vehicle 7100 takes a right turn and passes the crosswalk 7220, another pedestrian scenario may be considered. Namely, a pedestrian 7500 may be at the side of the road and traveling in a direction indicated by the arrow 7510. This operational environment information may not be unobservable due to an occlusion resulting from the presence of a tree 7600 (and hence forms another unobserved region).

In FIG. 7, another example of an unobserved region 7830 is shown with respect to the T-intersection 7200. A remote vehicle 7700 may be traveling into the T-intersection 7200. The outer bounds of a sensor range for a sensor attached to the left front bumper of the vehicle 7100 are shown by lines 7800 and 7810. A truck 7900 is located in a stationary position adjacent to the intersection 7200 such that the truck 7900 interferes with the path of the sensor defined by the lines 7800 and 7810. That is, the truck 7900 results in an occlusion. The cross-hatch between the lines 7810 and 7820 represents the occluded region or area that is unobservable by the vehicle 7100. If the remote vehicle 7700 were traveling into the T-intersection 7200, it would not be observed until the truck 7900 no longer obstructs the sensor of the vehicle 7100 (e.g., through movement of the vehicles 7100, 7700, or the truck 7900). In this example, only one sensor is shown for simplicity. However, sensors may be located such that sensor data is gathered about the entire perimeter of the vehicle.

In the diagram of FIG. 8, an autonomous vehicle 8100 is traveling along a four-lane road in a direction indicated by the solid arrow extending from the vehicle 8100. The vehicle 8100 is following a remote vehicle 8200 that is traveling in the same lane. In an adjacent lane, a remote vehicle 8300 travels in the same direction. In another adjacent lane, which is an oncoming lane, a remote vehicle 8400 is traveling in the opposite direction from the vehicle 8100. Depending upon the spacing of the vehicle 8100 and the remote vehicle 8200, and the sensor locations of the sensors of the vehicle 8100, the remote vehicle 8200 may block the sensors from observing the remote vehicle 8300, the remote vehicle 8400, or both. That is, one or more unobserved regions may result.

Determining a visibility grid comprising coordinates forming an unobserved region within a defined distance from the vehicle at 6120 can include defining a rectangle or other polygonal or round shape around the vehicle where the coordinates lie within the boundaries of the shape (e.g., the rectangle). The defined distance can be up 300 meters. The defined distance may depend upon the sensor ranges. For example, the defined distance may have a first value from the front and rear of the vehicle, and have a second, lower value from the sides of the vehicle 8200, reflecting that the sensors at the front and rear of the vehicle have a further range than the sensors at the side of the vehicle. When the shape is a rectangle, the rectangle may have sides of equal length. The sides of the rectangle may be proportional to those of the vehicle. In the example of FIG. 8, the shape is a rectangle 8500 that extends further to the front and back of the vehicle 8100 than to the sides. The shape may rotate with the heading of the vehicle over time. The visibility grid comprises coordinates within the shape, such as the rectangle 8500, and determining the visibility grid can also include adding an indication of whether each coordinate is within an observed region or an unobserved region. For example, the technique of ray tracing can be used to determine which regions are in a vehicle's line or sight, and which are not. This may be seen more clearly in FIGS. 9A-10B.

Figure 9A:
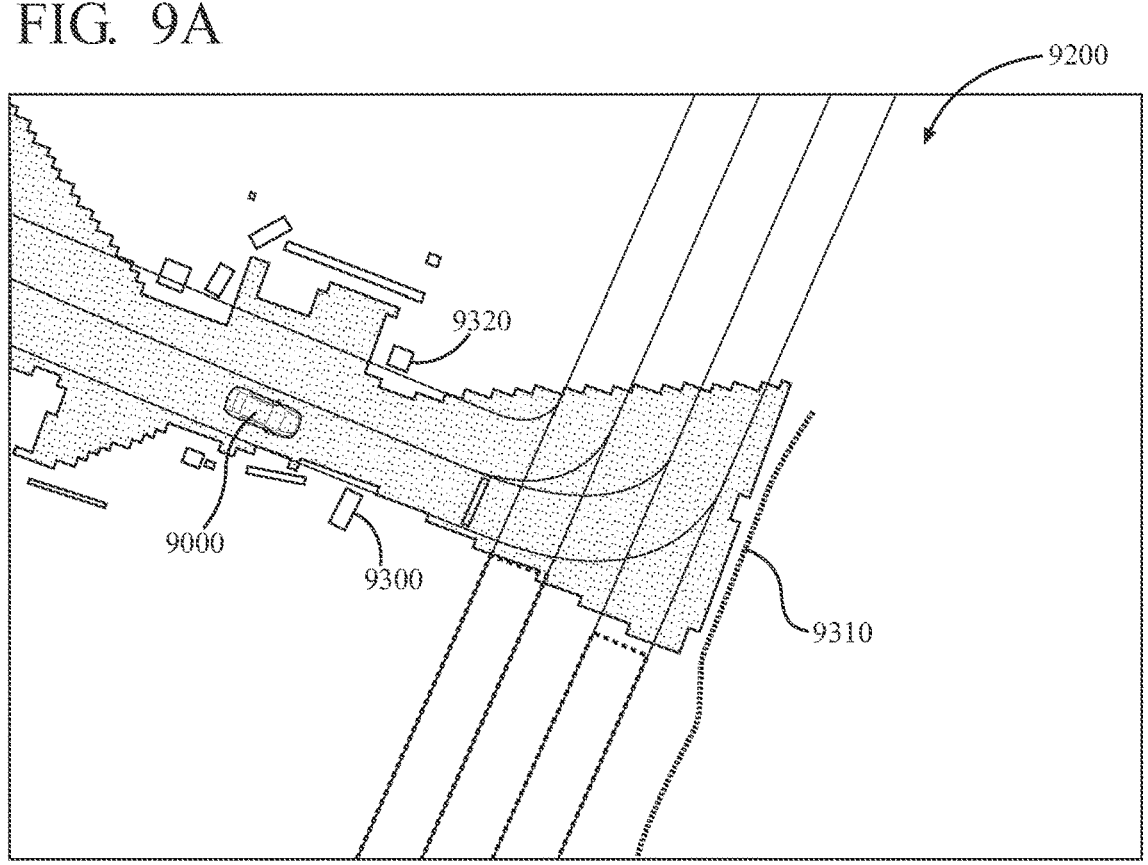
FIG. 9A is a diagram of a visibility grid for a vehicle approaching an intersection and located in a first position.
Figure 9B:
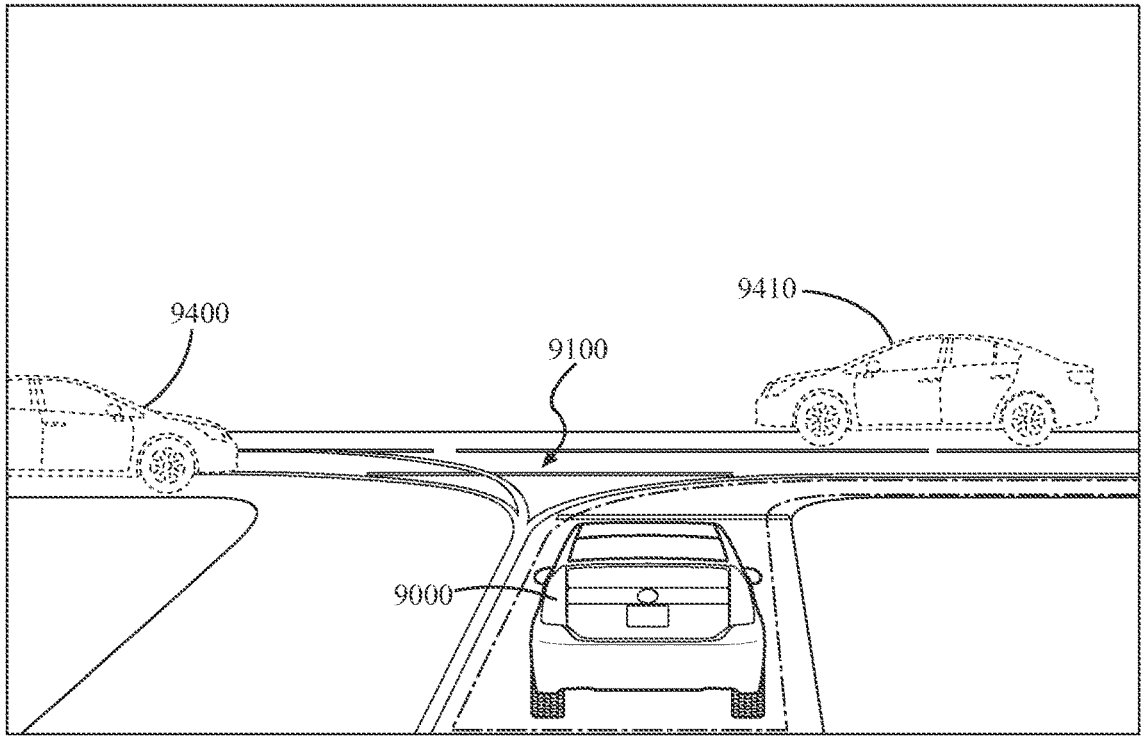
FIG. 9B is a visualization of virtual vehicles located within an unobserved region of FIG. 9A.
Figure 10A:
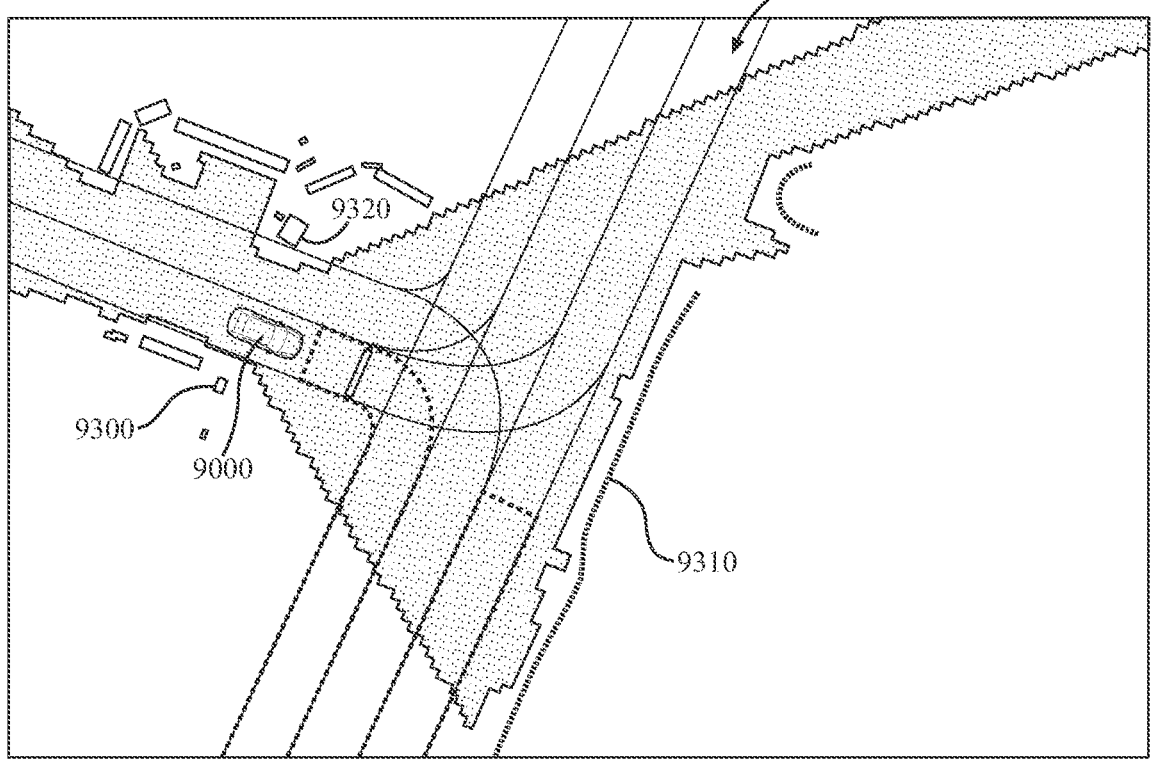
FIG. 10A is a diagram of a visibility grid for the vehicle approaching the intersection of FIG. 9A and located in a second position.
Figure 10B:
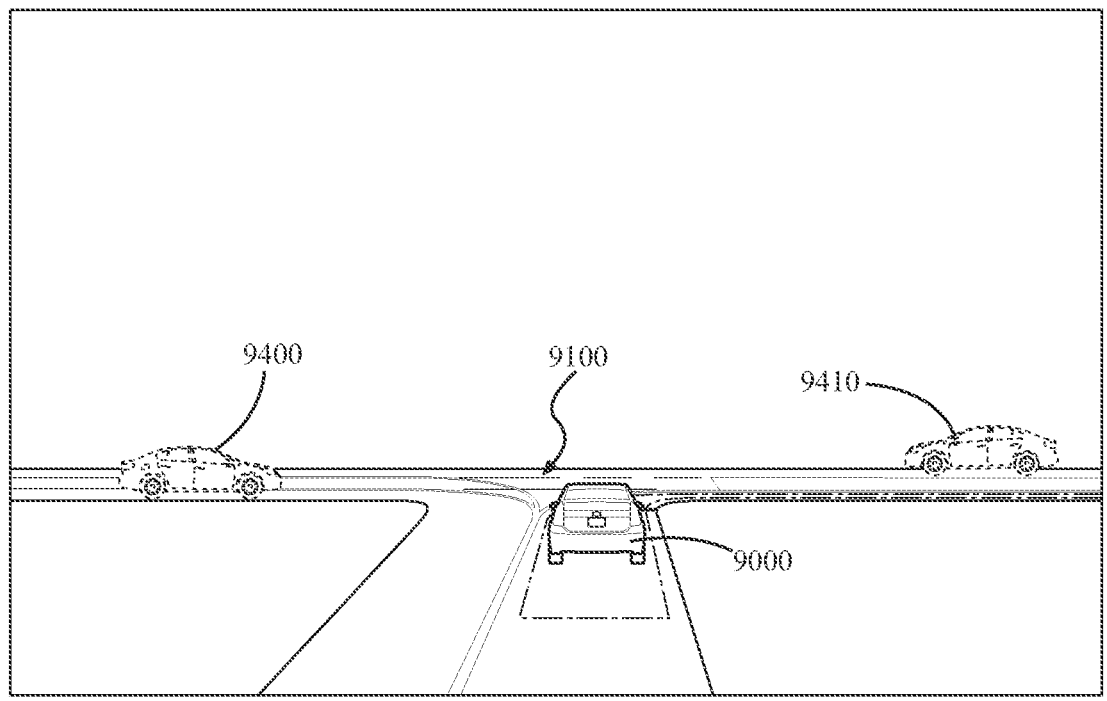
FIG. 10B is a visualization of virtual vehicles located within an unobserved region of FIG. 10A.

FIGS. 9A and 9B are diagrams of a visibility grid paired with a visualization of virtual vehicles located within an unobserved region. Similarly, FIGS. 10A and 10B are diagrams of a visibility grid paired with a visualization of virtual vehicles located within an unobserved region. The diagrams show a vehicle 9000 entering a T-intersection 9100, similar to that shown in FIG. 7, with a planned route or path that includes making a right turn at the T-intersection 9100. In FIGS. 9A and 9B, the vehicle 9000 is in a first position. In FIGS. 10A and 10B, the vehicle 9000 is in a second position closer to the T-intersection 9100. For the explanation of these examples, it is assumed that the diagram in FIG. 9A represents an entire visibility grid 9200 and that the diagram in FIG. 10A represents an entire visibility grid 9210. That is, the edges of each diagram are the edges of the respective visibility grid 9200, 9210. Within each of the visibility grids 9200, 9210, the coordinates are located within an observed region, shown with stippling. The visibility grid also represents several external objects 9300, 9310, 9320 that result in occlusions of the sensor data. Only some of the external objects are labeled for clarity. The external objects 9300, 9310, 9320 may be buildings, fences, signage, trees, other vehicles, etc. In some implementations, external objects may be omitted from the visibility grid. The remaining coordinates of a respective visibility grid 9200, 9210 form one or more unobserved regions.

Referring again to FIG. 6, after determining the visibility grid at 6120, the process 6000 advances to 6130. At 6130, the probability of a presence of an external object within the unobserved region is computed using the visibility grid. Computing the probability can include comparing the visibility grid to a map. Comparing the visibility grid to a map can include overlaying the visibility grid with the map using a common coordinate system. The map may be a high-definition (HD) map. The common coordinate system can be the coordinate system of the map, where the sensor data is transformed from its native coordinate system to the coordinate system of the map. The map may be a portion of the vehicle transportation network, similar to the example of the vehicle transportation network 3000 in FIG. 3. Based on important location(s) on the map (e.g., crosswalks, behind vehicles blocking sight, intersection lanes occluded by something, etc.), the probability that something can be in an unobserved region may be computed by integrating an area of an important location with the visibility grid. For example, comparing the visibility grid to the map can include determining a feature within the map, where the feature defines a polygonal region. Then, computing the probability comprises integrating an area of the polygonal region with the visibility grid. Integrating the area may include computing the probability as a proportion of observed points in the polygonal region to all points in the polygonal region.

The polygonal region is defined by the feature, and the feature may depend upon the identification of an important location. This may be explained by reference to how the probability may be computed for different SSOCEMs. For example, and with regards to a pedestrian SSOCEM, when a vehicle, such as the vehicle 7100, is approaching a crosswalk as indicated by the map, such as the crosswalk 7220, the feature is at least a portion of the crosswalk. The polygonal region may extend across the road (i.e., between entry points for the crosswalk) for the width of the crosswalk. That is, the polygonal region may be bounded by the edges of the road and the lines marking the crosswalk. Then, the proportion of the observed points among all points (both in observed and unobserved regions) within the polygonal region is a probability that an external object exists in the unobserved region. For example, the probability can be a probability of a presence of a pedestrian within or adjacent to the crosswalk. The pedestrian may be adjacent to an entrance of the crosswalk. In some implementations, a similar analysis may be done when an external object, such as a tree 7600, results in an unobserved region where a pedestrian may be jaywalking or starting to jaywalk, such as the pedestrian 7500. In this case, a default polygonal region may be defined that is the same width, or is narrower than, a standard crosswalk.

With regards to a lane change SSOCEM, when a vehicle, such as the vehicle 8100, is planning to change lanes, such as into the right traveling lane or into an oncoming lane, the feature is the lane into which the vehicle is attempting a lane change. This may also be referred to a lane adjacent to the lane in which the vehicle is traveling. The presence of other vehicles can result in an unobserved region in the adjacent lane. The probability that an external object exists an unobserved region may be equal to the proportion of the observed points among all points (both in observed and unobserved regions) within a polygonal region. For example, the probability can be a probability of a presence of a remote vehicle within the lane adjacent to the lane in which the vehicle is traveling. The dimensions of the polygonal region may vary depending upon whether the adjacent lane is a traveling lane in the same direction, including a lane available for a merge in some examples, or is an oncoming lane. For example, the polygonal region may be a defined length of the adjacent lane into which the vehicle is attempting the lane change. The polygonal region may extend across the width of the adjacent lane. The polygonal region can then extend ahead and behind the position of the autonomous vehicle to form the defined length. For example, the defined length of the polygonal region may extend from a first distance behind the vehicle to a second distance ahead of the vehicle, where the first distance and the second distance are equal. The first and second distances may be 50 meters in some implementations. In others, the distances may have a different value.

In contrast, when the lane adjacent to the lane in which the vehicle is traveling is an oncoming lane, the vehicle is attempting to pass using, e.g., the left oncoming traffic lane. A remote vehicle or other obstacle, such as the remote vehicle 8200, in front of the vehicle, such as the vehicle 8100, may result in an unobserved region in the oncoming lane such as described with regards to FIG. 8. The defined length of the polygonal region may extend from a first distance behind the vehicle to a second distance ahead of the vehicle where the first distance is shorter than the second distance. For example, the first distance may be 20 meters, while the second distance is 50 meters. Due to the different treatment of a lane change as compared to passing an obstacle using an oncoming lane, it is possible that the scenario of passing an obstacle is assigned a separate SSOCEM from the lane change SSOCEM. Similarly, a merge scenario may be assigned a separate SSOCEM from the lane change SSOCEM.

With regards to an intersection SSOCEM, when a vehicle, such as the vehicle 7100, is approaching an intersection, such as the T-intersection 7200, the feature is the lane in which the vehicle is traveling. The polygonal region may extend across the width of the lane. The polygonal region may extend from a defined distance behind a stop line of the intersection, such as the stop line 7210 of the T-intersection 7200, to the stop line. The defined distance may be 50 meters in some implementations. In others, the defined distance may have a different value. Then, the proportion of the observed points among all points (both in observed and unobserved regions) within the polygonal region is a probability that an external object exists in the unobserved region. For example, the probability can be a probability of a presence of a remote vehicle in another lane of the intersection.

Techniques for computing the probability described herein may vary. For example, the coordinates closer to the autonomous vehicle could be weighted differently from those more distant from the autonomous vehicle.

Once the probability is computed at 6130, the process 6000 can advance to 6140 to traverse a portion of the vehicle transportation network using the probability. Traversing the portion of the vehicle transportation network can include providing the probability to a scenario-specific operational control evaluation module instance of a scenario-specific operational control evaluation module from a plurality of scenario-specific operational control evaluation modules. For example, the probability could be provided to one or more of the SSOCEMs 4400 for a solution and output of candidate control actions as described with regards to the process 5000.

The probability may be considered representative of a virtual vehicle in a lane or a virtual pedestrian, e.g., in a crosswalk. These virtual external objects may be modeled in various ways. It is desirable if a virtual external object is modeled as a worst-case scenario in some implementations. For example, one condition that may belong to a worst-case scenario is that an object is located just outside of the observed coordinates in the visibility grid. That is, the object may be just inside of the unobserved region. Another condition of a worst-case scenario may be that the object is traveling towards the route or path of the autonomous vehicle and/or blocks the autonomous vehicle. A virtual pedestrian may be modeled as walking at a brisk pace, while a virtual vehicle may be modeled as traveling at the speed limit for the lane or road in which it is located (if it exists). The modeled virtual vehicle or pedestrian is treated as an actual vehicle or pedestrian (with a probability of existence) that can be used in the decision-making process. For example, when the autonomous vehicle 9000 is relatively far from the intersection 9100, as shown in FIG. 9A, the virtual vehicles 9400, 9410 shown in FIG. 9B are close to and heading into the intersection 9100. That is, they are represented at locations in the unobserved region adjacent to the observed region according to the visibility grid 9200 shown in FIG. 9A. As the autonomous vehicle 9000 moves closer to the intersection 9100, the virtual vehicles 9400, 9410 are farther away, as shown in FIG. 10B. This change in location is due to the change in the observed and unobserved regions over time. The virtual vehicles 9400, 9410 are represented at locations in the unobserved region adjacent to the observed region according to the visibility grid 9210 shown in FIG. 10A.

Although described herein with reference to an autonomous vehicle, the methods and apparatus described herein may be implemented in any vehicle capable of autonomous or semi-autonomous operation. Although a vehicle transportation network is described mainly with reference to road, the vehicle transportation network can include the vehicle operating in any area navigable by the vehicle.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network, the method comprising:
   receiving, from a sensor of a vehicle, sensor data for a portion of a vehicle operational environment while the vehicle is traversing the vehicle transportation network;
   determining, using the sensor data of the vehicle, a visibility grid comprising coordinates forming an unobserved region within a defined distance from the vehicle while the vehicle is traversing the vehicle transportation network;
   converting the coordinates of the visibility grid to a coordinate system of a map of the vehicle transportation network;
   overlaying the visibility grid with the map;
   computing a probability of whether an external object unobserved using the sensor data exists within the unobserved region by comparing the visibility grid to the map; and
   traversing a portion of the vehicle transportation network using the probability.

2. The method of claim 1, wherein comparing the visibility grid to the map comprises:
   determining a feature within the map, the feature defining a polygonal region, and wherein computing the probability comprises:
   integrating an area of the polygonal region with the visibility grid.

3. The method of claim 2, wherein integrating the area comprises:
   computing the probability as a proportion of observed points in the polygonal region to all points in the polygonal region.

4. The method of claim 3, wherein the polygonal region comprises a portion of a lane in which the vehicle is traveling extending from a defined distance behind a stop line of an intersection to the stop line, and wherein the probability comprises a probability of a presence of a remote vehicle in another lane of the intersection.

5. The method of claim 3, wherein the polygonal region comprises at least a portion of a crosswalk, and wherein the probability comprises a probability of a presence of a pedestrian within or adjacent to the crosswalk.

6. The method of claim 3, wherein the polygonal region comprises a defined length of a lane adjacent to a lane in which the vehicle is traveling, and wherein the probability indicates whether a remote vehicle is present within the lane adjacent to the lane in which the vehicle is traveling.

7. The method of claim 6, wherein the lane adjacent to the lane in which the vehicle is traveling comprises an oncoming lane, and the defined length extends from a first distance behind the vehicle to a second distance ahead of the vehicle, the first distance being shorter than the second distance.

8. The method of claim 6, wherein the lane adjacent to the lane in which the vehicle is traveling comprises at least one of a lane available for a traveling in a same direction or available for a merge of the vehicle, and the defined length extends from a first distance behind the vehicle to a second distance ahead of the vehicle, the first distance being equal to the second distance.

9. The method of claim 1, wherein determining the visibility grid comprises defining a rectangle around the vehicle, and wherein the coordinates lie within the rectangle.

10. The method of claim 1, wherein traversing the portion of the vehicle transportation network comprises:
providing the probability to a scenario-specific operational control evaluation module instance of a scenario-specific operational control evaluation module from a plurality of scenario-specific operational control evaluation modules.

11. The method of claim 10, wherein each scenario-specific operational control evaluation module from the plurality of scenario-specific operational control evaluation modules models a distinct vehicle operational scenario.

12. An apparatus for use in traversing a vehicle transportation network, the apparatus comprising:
a non-transitory computer readable medium; and
a processor configured to execute instructions stored on the non-transitory computer readable medium to:
receive, from a sensor of a vehicle, sensor data for a portion of a vehicle operational environment while the vehicle is traversing the vehicle transportation network;
determine, using the sensor data of the vehicle, a visibility grid comprising coordinates forming an unobserved region within a defined distance from the vehicle while the vehicle is traversing the vehicle transportation network;
convert the coordinates of the visibility grid to a coordinate system of a map of the vehicle transportation network;
overlay the visibility grid with the map;
compute a probability that an external object that is unobserved exists within the unobserved region by comparing the visibility grid to the map comprising a stored representation of a portion of the vehicle transportation network; and
traverse a portion of the vehicle transportation network using the probability.

13. The apparatus of claim 12, wherein the sensor comprises at least one of a lidar sensor or a depth-sensing camera.

14. The apparatus of claim 12, wherein the instructions to determine the visibility grid comprise instructions to define a rectangle around the vehicle based on the defined distance, the coordinates lie within the rectangle, and the instructions to compare the visibility grid to the map comprises instructions to overlap the rectangle of the visibility grid with the map in a common coordinate system.

15. The apparatus of claim 12, wherein the vehicle transportation network comprises at least one of an intersection, a crosswalk, or an adjacent lane to a lane in which the vehicle is traveling.

16. The apparatus of claim 15, wherein the probability comprises at least one of a probability that a remote vehicle exists in a lane of the intersection, a probability that a pedestrian exists adjacent to or within the crosswalk, a probability that a vehicle exists in an oncoming lane as the adjacent lane, or a probability that a vehicle exists in a lane having a direction of travel corresponding to the lane in which the vehicle is traveling as the adjacent lane.

17. The apparatus of claim 12, wherein the instructions to compare the visibility grid to the map comprises instructions to:
determine a feature within the map, the feature defining a polygonal region, and wherein the instructions to compute the probability comprises instructions to:
compute the probability as a proportion of observed points among all points in the polygonal region.

18. A vehicle including the apparatus of claim 12, and comprising:
a scenario-specific operational control evaluation module instance of a scenario-specific operational control evaluation module receiving the probability from the apparatus, the scenario-specific operational control evaluation module modeling a distinct vehicle operational scenario.

19. The vehicle of claim 18, wherein:
the scenario-specific operational control evaluation module instance comprises a first scenario-specific operational control evaluation module instance and the distinct vehicle operational scenario comprises a first distinct vehicle operational scenario, the vehicle further comprising:
a second scenario-specific operational control evaluation module instance of a second scenario-specific operational control evaluation module receiving the probability from the apparatus, the second scenario-specific operational control evaluation module modeling a second distinct vehicle operational scenario different from the first distinct vehicle operational scenario.

* * * * *